United States Patent
Gu et al.

(10) Patent No.: US 12,155,235 B2
(45) Date of Patent: Nov. 26, 2024

(54) ELECTRONIC DEVICE INCLUDING MATCHING CIRCUIT FOR REDUCING HARMONICS

(71) Applicant: SAMSUNG ELECTRONICS CO., LTD., Suwon-si (KR)

(72) Inventors: Beomwoo Gu, Suwon-si (KR); Jaeseok Park, Suwon-si (KR); Jaehyun Park, Suwon-si (KR); Sungku Yeo, Suwon-si (KR); Jungkyu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/070,854

(22) Filed: Nov. 29, 2022

(65) Prior Publication Data

US 2023/0170743 A1    Jun. 1, 2023

Related U.S. Application Data

(63) Continuation of application No. PCT/KR2022/019081, filed on Nov. 29, 2022.

(30) Foreign Application Priority Data

Nov. 29, 2021  (KR) ........................ 10-2021-0167298

(51) Int. Cl.
*H02J 50/70* (2016.01)
*H02J 50/12* (2016.01)

(52) U.S. Cl.
CPC .............. *H02J 50/70* (2016.02); *H02J 50/12* (2016.02)

(58) Field of Classification Search
None
See application file for complete search history.

(56) References Cited

U.S. PATENT DOCUMENTS

2004/0113689 A1    6/2004  Hajimiri et al.
2009/0284245 A1    11/2009 Kirby et al.
(Continued)

FOREIGN PATENT DOCUMENTS

CN    110048520       7/2019
CN    213125981 U     5/2021
(Continued)

OTHER PUBLICATIONS

International Search Report dated Mar. 7, 2023 for PCT/KR2022/019081.
PCT Written Opinion dated Mar. 7, 2023 for PCT/KR2022/019081.

*Primary Examiner* — Jared Fureman
*Assistant Examiner* — Aqeel H Bukhari
(74) *Attorney, Agent, or Firm* — Nixon & Vanderhye P.C.

(57) ABSTRACT

A wireless power transmitter may include a power amplifier configured to output an amplified signal based on an input signal and a driving voltage, a first LC resonant circuit connected in parallel to the power amplifier, a matching circuit, and a transmission coil connected to the matching circuit. The matching circuit may include a second LC resonant circuit including a first inductor and a first capacitor connected in series to the first inductor, and having one end connected to an output terminal of the power amplifier and one end of the first LC resonant circuit, and a second capacitor and a third capacitor respectively connected to the other end of the second LC resonant circuit. The first inductor may be configured to have an inductance value leading to an impedance of the second LC resonant circuit equal to or greater than a first predetermined magnitude at at least one second or higher harmonic frequency of an operating frequency of the input signal.

20 Claims, 13 Drawing Sheets

(56) References Cited

U.S. PATENT DOCUMENTS

| | | |
|---|---|---|
| 2010/0184371 A1 | 7/2010 | Cook et al. |
| 2014/0240057 A1 | 8/2014 | Low et al. |
| 2015/0069854 A1 | 3/2015 | Kim et al. |
| 2015/0171657 A1 | 6/2015 | Wheeland et al. |
| 2015/0194811 A1 | 7/2015 | Mao |
| 2017/0085113 A1 | 3/2017 | Yang et al. |
| 2017/0170794 A1 | 6/2017 | Mayo et al. |
| 2018/0062421 A1 | 3/2018 | Danilovic |
| 2019/0027970 A1 | 1/2019 | Kawamae et al. |
| 2019/0140482 A1 | 5/2019 | Moon et al. |
| 2020/0153286 A1 * | 5/2020 | Mao ................. H02J 50/12 |
| 2020/0266776 A1 | 8/2020 | Sasaya et al. |

FOREIGN PATENT DOCUMENTS

| | | |
|---|---|---|
| KR | 10-2012-0128544 A | 11/2012 |
| KR | 10-2015-0029799 A | 3/2015 |
| KR | 10-2015-0121066 A | 10/2015 |
| KR | 10-2016-0099664 A | 8/2016 |
| KR | 10-2018-0092980 A | 8/2018 |
| KR | 10-2019-0040289 A | 4/2019 |
| KR | 10-2019-0052494 A | 5/2019 |

\* cited by examiner (a)

(b)

ELECTRONIC DEVICE INCLUDING MATCHING CIRCUIT FOR REDUCING HARMONICS

CROSS REFERENCE TO RELATED APPLICATION

This application is a continuation of International Application No. PCT/KR2022/019081 designating the United States, filed on Nov. 29, 2022 in the Korean Intellectual Property Receiving Office and claiming priority to Korean Patent Application No. 10-2021-0167298, filed on Nov. 29, 2021, the disclosures of which are all hereby incorporated herein by reference for all purposes as if fully set forth herein.

FIELD

Various example embodiments of the disclosure relate to an electronic device including a matching circuit for reducing harmonics.

BACKGROUND

An inverter is a device that converts direct current (DC) power into alternating current (AC) power. In order to increase the efficiency of the inverter, various matching circuits may be coupled to an output terminal of the inverter.

A class E inverter (or a class E power amplifier (PA)) is an example of the inverter. Because of its operation under a zero-voltage switching (ZVS) condition and a zero-derivative voltage switching (ZDS) condition, the class E inverter may efficiently operate at a high switching frequency (e.g., 1 MHz or above). A class $EF_n$ inverter or a class $E/F_n$ inverter (n is an integer equal to or greater than 2), in which a resonant network is added in parallel to a load network, is used to increase the efficiency of the class E inverter.

A class $EF_2$ inverter often has a structure in which an LC series resonant circuit is connected in parallel to a load network in the class E inverter. As a load impedance $Z_L$ changes according to the distance between a metal (e.g., a receiving terminal) and the class $EF_2$ inverter, the efficiency of the class $EF_2$ inverter may decrease.

To prevent or reduce a decrease in the efficiency of an inverter, various resonant networks (e.g., matching circuits) may be disposed between a PA (e.g., a transistor) and a load network. However, failure in effectively blocking harmonics generated from the PA may cause distortion of an output waveform of the PA.

SUMMARY

According to an embodiment, an electronic device including a resonant circuit between a PA and a load network, and a method of controlling the same may be provided.

According to an embodiment, an electronic device including a resonant circuit with a high input impedance at a harmonic frequency, and a method of controlling the same may be provided.

According to an embodiment, a wireless power transmitter may include a power amplifier configured to output an amplified signal based on an input signal and a driving voltage, a first LC resonant circuit connected (directly or indirectly) in parallel to the power amplifier, a matching circuit, and a transmission coil connected (directly or indirectly) to the matching circuit. The matching circuit may include a second LC resonant circuit including a first inductor and a first capacitor connected (directly or indirectly) in series to the first inductor, and having one end connected to an output terminal of the power amplifier and one end of the first LC resonant circuit, and a second capacitor and a third capacitor respectively connected (directly or indirectly) to the other end of the second LC resonant circuit. The first inductor may be configured to have an inductance value leading to an impedance of the second LC resonant circuit equal to or greater than a first predetermined magnitude at at least one second or higher harmonic frequency of an operating frequency of the input signal.

According to an embodiment, an electronic device may include a resonant circuit with a high input impedance at a harmonic frequency between a power amplifier (PA) and a load network, thereby reducing the distortion of an output waveform of the PA.

Various effects exerted by the disclosure are not limited to the above-described effects.

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
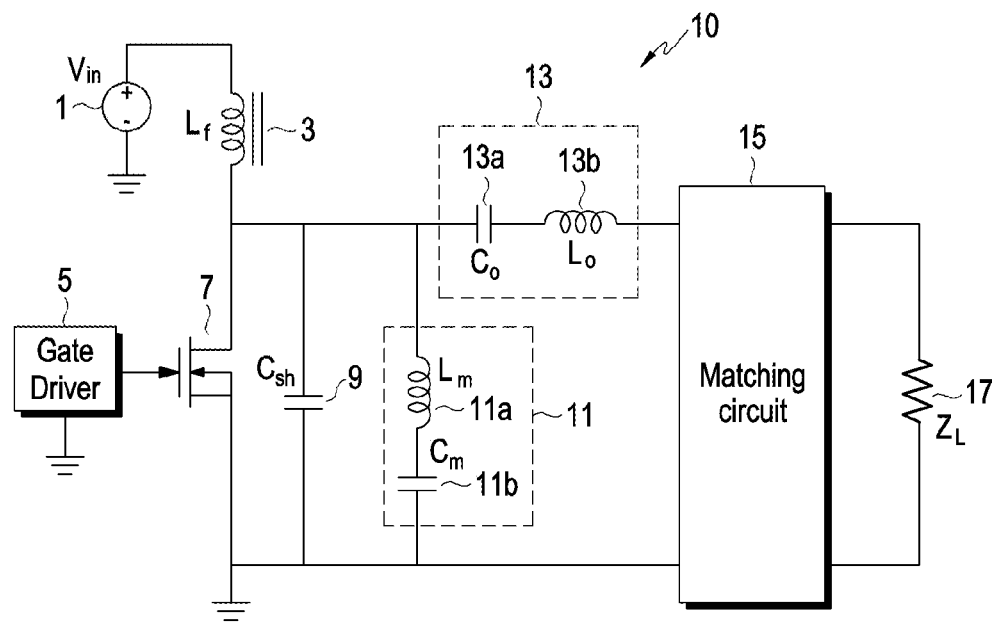
FIG. 1 is a diagram illustrating an exemplary $EF_2$ inverter according to a comparative example.

FIG. 1 is a diagram illustrating an exemplary $EF_2$ inverter 10 according to a comparative example.

The $EF_2$ inverter 10 may include a radio frequency (RF) choke inductor $L_f$ 3, a gate driver 5, a transistor 7, a shunt capacitor $C_{sh}$ 9, a first LC resonant circuit 11, a second LC resonant circuit 13, and a matching circuit 15.

The transistor 7 may operate by receiving a direct current (DC) voltage $V_{in}$ as a driving voltage from an input power supply 1. The transistor 7 may be turned on or off by receiving an input signal in the form of a pulse (e.g., a square wave) from the gate driver 5 through an input terminal (e.g., a gate). The transistor 7 may include a metal oxide semiconductor field effect transistor (MOSFET).

The RF choke inductor 3 may block transmission of an RF signal from the input power supply 1 to the transistor 7 so that only a DC current is transmitted to the transistor 7.

The shunt capacitor 9 may be connected in parallel to the transistor 7, and discharged or charged while the transistor 7 is turned on or off. The shunt 5 capacitor 9 may be a separate capacitor connected in parallel to the transistor 7, and described as a concept covering an internal capacitance (e.g., a drain-source capacitance $C_{ds}$) of the transistor 7.

RF power may be generated based on whether the transistor 7 is turned on or off by receiving the input signal from the gate driver 5. The generated RF power may be transmitted to the first LC resonant circuit 11 and/or the second LC resonant circuit 13 through an output terminal of the transistor 7. More specifically, when the transistor 7 is turned on (e.g., when the transistor 7 is saturated), the transistor 7 may be electrically shorted and thus interpreted as a short circuit for ground connected to a source, and a voltage at the output terminal of the transistor 7 may be interpreted as zero. A current flowing to the transistor 7 through the RF choke inductor 3 may gradually increase. Then, when the transistor 7 is turned off, the current flowing through the RF choke inductor 3 may be directed to the shunt capacitor 9, and as the shunt capacitor 9 is gradually charged, the voltage at the output terminal of the transistor 7 (e.g., a voltage across the shunt capacitor 9) may increase until it reaches a maximum or high value. Subsequently, as the shunt capacitor 9 is gradually discharged, a current may flow from the shunt capacitor 9 to the first LC resonant circuit 11 and/or the second LC resonant circuit 13 through the output terminal of the transistor 7, thereby gradually decreasing the voltage across the shunt capacitor 9. The transistor 7, the shunt capacitor 9, and the input signal may be set such that before the transistor 7 is turned on after turn-off (e.g. before the current begins again to flow into the transistor 7 through the RF choke inductor 3), the voltage at the output terminal of the transistor 7 (e.g., the voltage across the shunt capacitor 9 and a drain-source voltage of the transistor 7) gradually decreases to zero, and a decrement of the voltage at the output terminal of the transistor 7 becomes zero. When the transistor 7 is then turned on again, the current flowing through the RF choke 5 inductor 3 may be directed to the transistor 7, and the voltage at the output terminal of the transistor 7 may be maintained to be zero while the transistor 7 is in an on state. As described above, while the transistor 7 is in the on state, the voltage at the output terminal of the transistor 7 is zero, and while the transistor 7 is in an off state, the current flowing through the RF choke inductor 3 is directed to the shunt capacitor 9, and the current flowing through the RF choke inductor 3 to the transistor 7 is zero (that is, a period during which the voltage at the output terminal of the transistor 7 is non-zero does not overlap with a period during which the drain-source current is non-zero). Therefore, power dissipated in the transistor 7 may ideally be zero. However, because the transistor 7 generates RF power based on turn-on or turn-off in a non-ideal case, the generated RF power may include a second or higher harmonic component as well as a desired frequency component (e.g., a fundamental component of an operating frequency). The duty cycle of the transistor 7 may be set, for example, to 50% based on the input signal.

The first LC resonant circuit 11 may be connected in parallel to the transistor 7. The first LC resonant circuit 11 may include a first inductor $L_m$ 11a and a first capacitor $C_m$ 11b connected in series to each other. The first inductor 11a and the first capacitor 11b may have appropriate element values such that a resonance frequency of the first LC resonant circuit 11 corresponds to the second harmonic frequency $2f_s$ of the operating frequency $f_s$ of the input signal. The first LC resonant circuit 11 may be electrically interpreted as a short circuit at the second harmonic frequency $2f_s$. Based on being electrically shorted at the second harmonic frequency $2f_s$, the first LC resonant circuit 11 may operate as a second harmonic filter (e.g., a band-stop filter) that prevents or reduces transmission of a second harmonic component of the RF power generated from the transistor 7 to the second LC resonant circuit 13.

The second LC resonant circuit 13 may be connected in series to the output terminal of the transistor 7. The second LC resonant circuit 13 may include a second capacitor $C_o$ 13a and a second inductor $L_o$ 13b connected in series to each other. The second capacitor 13a and the second inductor 13b may have appropriate element values such that a resonance frequency of the second LC resonant circuit 13 corresponds to the operating frequency $f_s$ (e.g., a fundamental frequency (or a first harmonic frequency) $f_s$) of the input signal. The second LC resonant circuit 13 may be electrically interpreted as a short circuit at the first harmonic frequency $f_s$. Based on electrically being shorted at the first harmonic frequency $f_s$, the second LC resonant circuit 13 may operate as a band-pass filter (or a low-pass filter) that passes the fundamental component (or the first harmonic component) of the RF power generated from the transistor 7.

The matching circuit 15 may be connected in series to the second LC resonant circuit 13. The matching circuit 15 may provide impedance matching such that an output impedance (e.g., an impedance facing the second LC resonant circuit 13) matches the impedance of a load $Z_L$ 17. The matching circuit 15 may include, for example, at least one low-pass filter and/or band-stop filter, and the low-pass filter may include at least one capacitor.

The load 17 may include at least one hardware component (e.g., a circuit element) that receives the RF power generated by the $EF_2$ inverter 10 or operates by receiving the RF power. For example, the load 17 may be a hardware component (e.g., a transmission coil) of an electronic device (not shown) (e.g., a wireless power transmitter) including the $EF_2$ inverter 10 and/or a receiving device (e.g., a wireless power receiver) that receives power from a magnetically coupled electronic device (not shown).

According to a comparative example, when a metal (e.g., a wireless 5 power receiver) approaches the $EF_2$ inverter 10, the impedance $Z_L$ facing the load 17 may increase, thereby decreasing the efficiency of the $EF_2$ inverter 10. When auto matching is performed by changing the capacitance of the low-pass filter of the matching circuit 15 (e.g., by using a switched capacitor connected in parallel to a capacitor of the low-pass filter), the output power of the $EF_2$ inverter 10 may be increased, but it may be difficult to increase the output efficiency of the $EF_2$ inverter 10.

Figure 2:
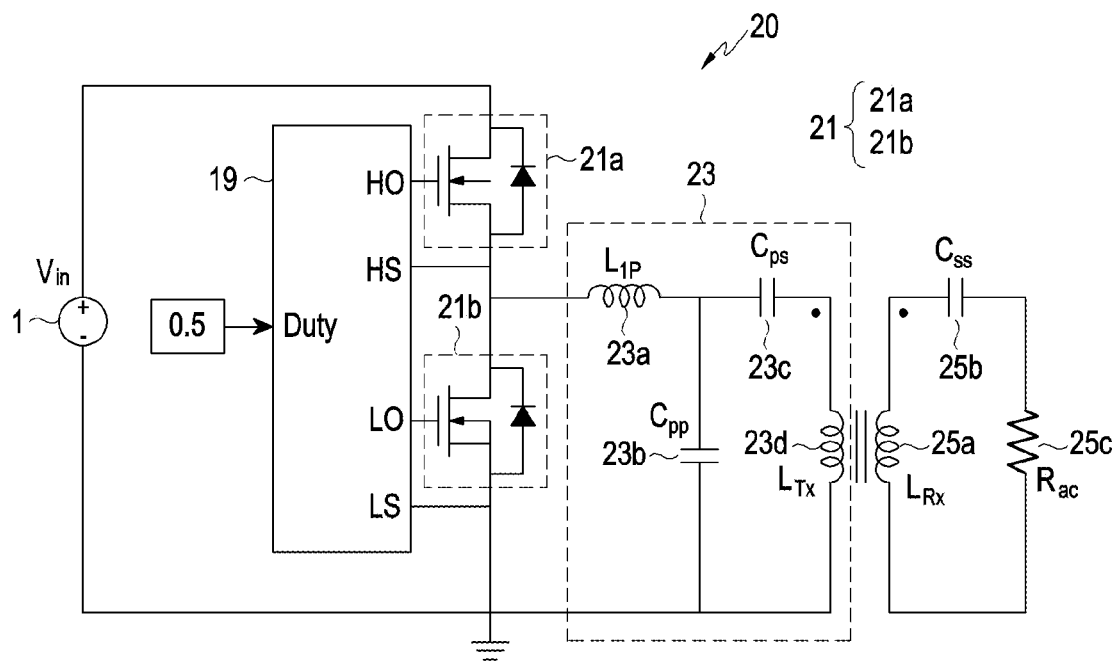
FIG. 2 is a diagram illustrating an exemplary LCC inverter according to a comparative example.

FIG. 2 is a diagram illustrating an exemplary LCC inverter 20 according to a comparative example.

The LCC inverter 20 may include a gate driver 19, a half-bridge inverter 21, a resonant network 23, and a load network (e.g., network including a load $R_{ac}$ 25c, a third inductor $L_{RX}$ 25a and a third capacitor $C_{SS}$ 25b).

The half-bridge inverter 21 may operate by receiving a DC voltage $V_{in}$ as a driving voltage from the input power supply 1. The half-bridge inverter 21 may include a first transistor 21a and a second transistor 21b. Each of the first transistor 21a and the second transistor 21b may be turned on or off by receiving an input signal in the form of a pulse (e.g., a square wave) from the gate driver 19 through an input terminal (e.g., a gate). Each of the first transistor 21a and the second transistor 21b may include a MOSFET. RF power may be generated based on the first transistor 21a and the second transistor 21b being turned on or off by receiving the input signal from the gate driver 19. The generated RF power may be transmitted to the resonant network 23 through an output terminal of the half-bridge inverter 21.

The gate driver 19 may be disposed such that an HO terminal is connected to a gate terminal of the first transistor 21a, and an HS terminal is connected to a source terminal of the first transistor 21a. The gate driver 19 may be disposed such that an LO terminal is connected to a gate terminal of the second transistor 21b, and an LS terminal is connected to a source terminal of the second transistor 21b. The gate driver 19 may control an on/off state by setting the duty cycle of each of the first transistor 21a and the second transistor 21b to 50%.

The resonant network 23 may include a first inductor $L_{IP}$ 23a, a first capacitor $C_{PP}$ 23b, a second capacitor $C_{PS}$ 23c, and a second inductor $L_{TX}$ 23d. The first inductor 23a, the first capacitor 23b, the second capacitor 23c, and the second inductor 23d may form a primary-side resonant tank. A third inductor $L_{RX}$ 25a and a third capacitor $C_{SS}$ 25b may form a secondary-side resonant tank. The second inductor 23d and the third inductor 25a may be magnetically coupled to each other. The first inductor 23a may be disposed such that one end thereof is connected to the output terminal of the half-bridge inverter 21, and the other end thereof is connected to the first capacitor 23b and the second capacitor 23c. The resonance frequency $f_r$ of the resonant circuit 23 may correspond to the operating frequency $f_s$ (e.g., the fundamental frequency (or the first harmonic frequency)) of the input signal, and the first inductor 23a, the first capacitor 23b, the second capacitor 23c, and the second inductor 23d may have appropriate element values (e.g., $L_{IP}$, $C_{PP}$, $C_{PS}$, and $L_{TX}$) satisfying Equation 1 and/or Equation 2.

$$f_r = \frac{1}{2\pi\sqrt{L_{1P}C_{PP}}}$$ [Equation 1]

$$f_r = \frac{1}{2\pi\sqrt{L_{TX}(C_{PP} \text{ // } C_{PS})}}$$ [Equation 2]

A load $R_{ac}$ 25c may include at least one hardware component (e.g., a circuit element) that receives RF power generated by the half-bridge inverter 21 or operates by the RF power. For example, the load 25c may include a hardware component (e.g., a transmission coil) of an electronic device (not shown) (e.g., a wireless power transmitter) including the LCC inverter 20, and/or a receiving device (e.g., a wireless power receiver) that receives power from an electronic device (not shown).

According to a comparative example, the impedance $Z_L$ facing the resonant network 23 may change according to a distance between a metal (e.g., a wireless power receiver) and the LCC inverter 20. The LCC inverter 20 may have the property that output efficiency is maintained despite of a change in the impedance $Z_L$. However, compared to the $EF_2$ inverter 10 of FIG. 1, the LCC inverter 20 uses a high-side transistor (e.g., the first transistor 21a) and a low-side transistor (e.g., the second transistor 21b), and thus the LCC inverter 20 may experience a greater efficiency loss than the $EF_2$ inverter 10.

According to the comparative examples described with reference to FIGS. 1 and 2, the efficiency of the $EF_2$ inverter 10 may be decreased due to the proximity of a metal (e.g., a wireless power receiver), whereas the LCC inverter 20 may have decreased efficiency due to transistors despite robustness against the proximity of a metal.

Accordingly, a method of improving efficiency by minimizing or reducing the number of used elements, with robustness against the proximity of a metal will be described in the disclosure.

Figure 3:
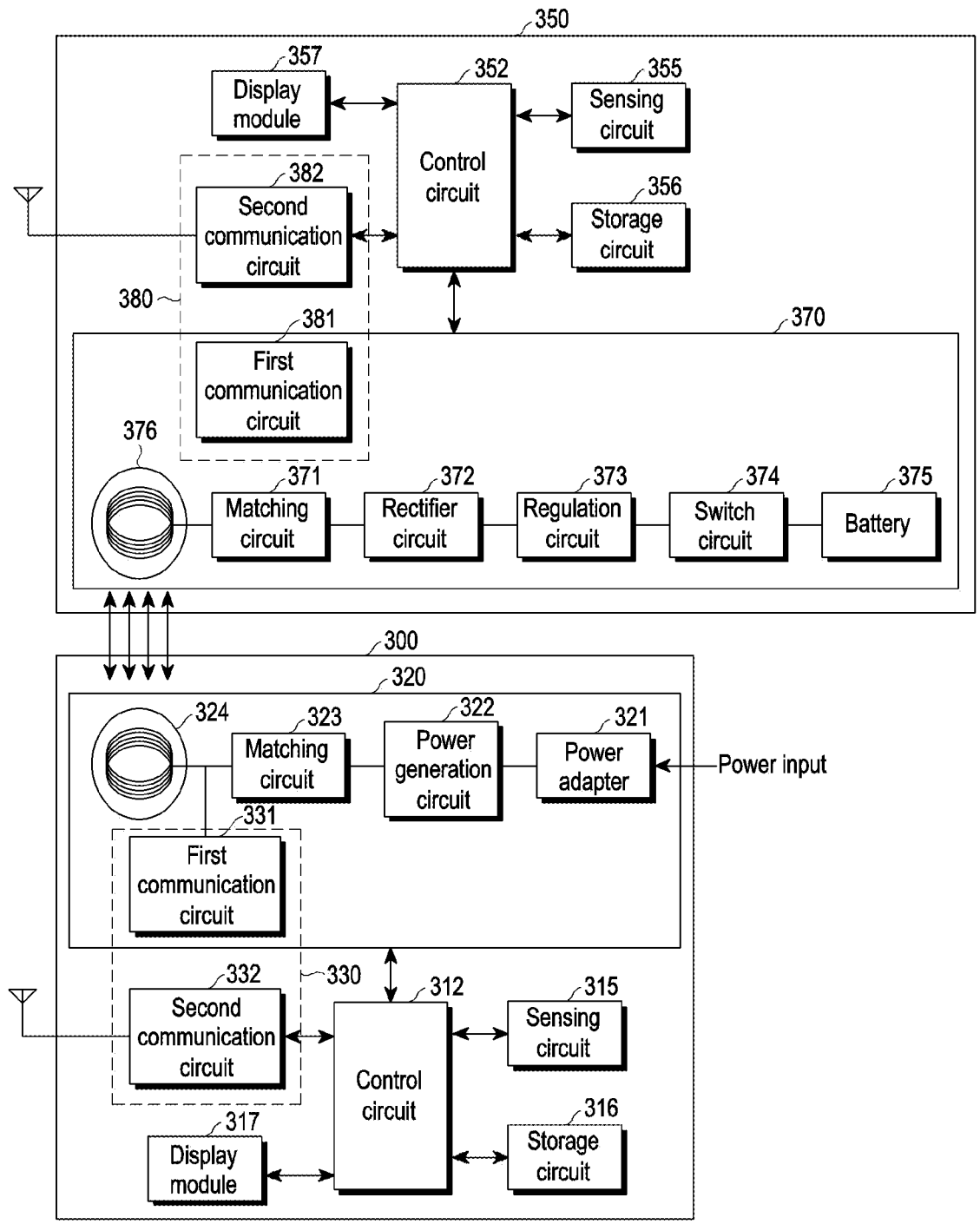
FIG. 3 is a block diagram illustrating a wireless power transmitter and a wireless power receiver according to an example embodiment.

FIG. 3 is a block diagram illustrating a wireless power transmitter 300 and a wireless power receiver 350 according to an example embodiment.

According to an embodiment, the wireless power transmitter 300 (e.g., a wireless power transmission device) may include a power transmission circuit 320, a control circuit 312, a communication circuit 330, a sensing circuit 315, and/or a storage circuit 316.

According to an embodiment, the wireless power transmitter 300 may supply power to the wireless power receiver 350 through the power transmission circuit 320. For example, the wireless power transmitter 300 may transmit power according to a resonance method. In the case of a resonance method, the wireless power transmitter 300 may be implemented in a manner defined by, for example, the Alliance for Wireless Power (A4WP) standard (or the air fuel alliance (AFA) standard). The wireless power transmitter 300 may generate a conductive pattern 324 (e.g., a transmitting coil) capable of generating an induced magnetic field (e.g., a Tx field) when a current (e.g., alternating current (AC)) flows according to the resonance method or an induction method. A process of generating a magnetic field (e.g., a Tx field) through the conductive pattern 324 in the wireless power transmitter 300 may be expressed as wireless power output, and a process of generating an induced electromotive force based on a magnetic field (e.g., a Tx field) generated through the conductive pattern 324 in the wireless power receiver 350 may be expressed as wireless power reception. It may be said that the wireless power transmitter 300 wirelessly transmits power to the wireless power receiver 350 through these processes. In addition, the wireless power receiver 350 may include a conductive pattern 376 (e.g., a reception coil) in which an induced electromotive force is generated by a magnetic field (e.g., a Tx field) changing in magnitude over time, formed around the conductive pattern 376. As the induced electromotive force is generated in the conductive pattern 376 of the wireless power receiver 350, a process of outputting AC current from the conductive pattern 376 or applying an AC voltage to the conductive pattern 376 may be expressed as wireless reception of power in the wireless power receiver. In another example, the wireless power transmitter 300 may transmit power according to the induction method. In the case of the induction method, the wireless power transmitter 300 may be implemented in a manner defined by, for example, the wireless power consortium (WPC) standard (or Qi standard).

According to an embodiment, the power transmission circuit 320 may include a power adapter 321, a power generation circuit 322, a matching circuit 323, the conductive pattern (e.g., transmission coil) 324, or a first communication circuit 331. According to an embodiment, the power transmission circuit 320 may be configured to wirelessly transmit power to the wireless power receiver 350 through the conductive pattern 324. According to an embodiment, the power transmission circuit 320 may receive power in the form of a DC or AC waveform from the outside, and supply the received power to the wireless power receiver 350 in the form of an AC waveform.

According to an embodiment, the power adapter 321 may receive AC or DC power from the outside or a power signal of a battery device, and output DC power having a specified voltage value. According to an embodiment, the voltage value of the DC power output from the power adapter 321 may be controlled by the control circuit 312. According to an embodiment, the DC power output from the power adapter 321 may be output to the power generation circuit 322.

According to an embodiment, the power generation circuit 322 may convert DC current received from the power adapter 321 into AC current and output the converted AC current. According to an embodiment, the power generation circuit 322 may include a predetermined amplifier (not shown). According to an embodiment, when the DC current received through the power adapter 321 is less than a specified gain, the power generation circuit 322 may amplify the DC current to a specified gain by using the amplifier (not shown). Alternatively, the power generation circuit 322 may include a circuit that converts the DC current received from the power adapter 321 into AC current based on a control signal received from the control circuit 312. For example, the power generation circuit 322 may convert the DC current received from the power adapter 321 into AC current through a predetermined inverter 5 (not shown). Alternatively, the power generation circuit 322 may include a gate driving device (not shown). The gate driving device (not shown) may convert the DC current received from the power adapter 321 into the AC current by controlling on/off of the DC current. Alternatively, the power generation circuit 322 may generate an AC power signal through a wireless power generator (e.g., an oscillator).

According to an embodiment, the matching circuit 323 may perform impedance matching. For example, when the AC current (e.g., AC signal) output from the power generation circuit 322 is transmitted to the conductive pattern 324, an electromagnetic field may be formed in the conductive pattern 324 by the transmitted AC signal. The frequency band of the formed electromagnetic field (e.g., an electromagnetic field signal) may be adjusted by adjusting the impedance of the matching circuit 323. According to an embodiment, the matching circuit 323 may control output power transmitted to the wireless power receiver 350 through the conductive pattern 324 to have high efficiency or high output by adjusting the impedance. According to an embodiment, the matching circuit 323 may adjust the impedance based on the control of the control circuit 312. The matching circuit 323 may include at least one of an inductor (e.g., a coil), a capacitor, or a switch device. The control circuit 312 may control a connection state with at least one of an inductor or a capacitor through a switch device, and thus perform impedance matching.

According to an embodiment, the first communication circuit 331 (e.g., a resonant circuit) may perform (e.g., data communication) in an in-band manner, using electromagnetic waves generated from the conductive pattern 324.

According to an embodiment, the sensing circuit 315 may sense a change in current/voltage applied to the conductive pattern 324 of the power transmission circuit 320. The amount of power to be transmitted to the wireless power receiver 350 may vary according to the change in the current/voltage applied to the 5 conductive pattern 324. Alternatively, the sensing circuit 315 may sense a temperature change of the wireless power transmitter 300. According to an embodiment, the sensing circuit 315 may include at least one of a current/voltage sensor or a temperature sensor.

According to an embodiment, the control circuit 312 may control the operations of the wireless power transmitter 300. For example, the control circuit 312 may control the operations of the wireless power transmitter 300 using an algorithm, program, or application required for control, stored in the storage circuit 316. The control circuit 312 may be implemented in a form such as a central processing unit (CPU), a microprocessor, or a mini computer. For example, the control circuit 312 may display a state of the wireless power receiver 350 on the display module 317 based on a message received from the wireless power receiver 350 through the communication circuit 330.

According to an embodiment, the control circuit 312 may control to wirelessly transmit power to the wireless power receiver 350 through the power transmission circuit 320. According to an embodiment, the control circuit 312 may control to wirelessly receive information from the wireless power receiver 350 through the communication circuit 330.

According to an embodiment, the information received from the wireless power receiver 350 may include at least one of charging setting information related to a battery state of the wireless power receiver 350, power amount control information related to the amount of power transmitted to the wireless power receiver 350, environmental information related to a charging environment of the wireless power receiver 350, or time information about the wireless power receiver 350. According to an embodiment, the charging setting information may be information related to the battery state of the wireless power receiver 350 at the time of wireless charging between the wireless power transmitter 300 and the wireless power receiver 350. For example, the charging setting information may include information about at least one of a total battery capacity of the wireless power receiver 350, a remaining battery capacity, the number of charging times, a battery usage, a charging mode, a charging method, or a wireless reception frequency band. According to an embodiment, the power amount control information may include information for controlling the amount of initial power transmitted according to a change in the amount of power charged in the wireless power receiver 350 during wireless charging between the wireless power transmitter 300 and the wireless power receiver 350. According to an embodiment, the environmental information, which is information obtained by measuring the charging environment of the wireless power receiver 350 by a sensing circuit 355 of the wireless power receiver 350, may include, for example, at least one of temperature data including at least one of an internal temperature or an external temperature, illuminance data indicating an illuminance (brightness) around the wireless power receiver 350, or sound data indicating sound (noise) around the wireless power receiver 350. According to an embodiment, the control circuit 312 may control to generate power to be transmitted to the wireless power receiver 350 or control to transmit the power to the wireless power receiver 350 based on the charging setting information out of the information received from the wireless power receiver 350. Alternatively, the control circuit 312 may determine or change the amount of power transmitted to the wireless power receiver 350 based on at least part of the information received from the wireless power receiver 350 (e.g., at least one of the power amount control information, the environmental information, or the time information). Alternatively, the control circuit 312 may control the matching circuit 323 to change an impedance.

According to an embodiment, the display module 317 (including a display) may display overall information related to the state of the wireless power transmitter 300, environmental information, or a charging state.

According to an embodiment, the communication circuit 330 may communicate with the wireless power receiver 350 in a specific method. The communication circuit 330 may perform data communication with a communication circuit 380 of the wireless power receiver 350. For example, the communication circuit 330 may unicast, multicast, or broadcast a signal.

According to an embodiment, the communication circuit 330 may include at least one of a first communication circuit 331 implemented as one piece of hardware with the power transmission circuit 320 so that the wireless power transmitter 300 may communicate in the in-band manner, or a second communication circuit 332 implemented in hardware different from the power transmission circuit 320 so that the wireless power transmitter 300 may communicate in an out-of-band manner.

According to an embodiment, when the communication circuit 330 includes the first communication circuit 331 capable of performing communication in the in-band manner, the first communication circuit 331 may receive the frequency and signal level of an electromagnetic field signal received through the conductive pattern 324 of the power transmission circuit 320. The control circuit 312 may extract information received from the wireless power receiver 350 by decoding the frequency and signal level of the electromagnetic field signal received through the conductive pattern 324. Alternatively, the first communication circuit 331 may transmit information of the wireless power transmitter 300 to the wireless power receiver 350 by applying a signal for the information of the wireless power transmitter 300 to be transmitted to the wireless power receiver 350 to the conductive pattern 324 of the power transmission circuit 320 (e.g., by changing the impedance of a load (e.g., the conductive pattern 324) according to an on/off keying modulation scheme or adding the signal for the information of the wireless power transmitter 300 to an electromagnetic field signal generated through application of a signal output from the matching circuit 323 to the conductive pattern 324. The control circuit 312 may control to output the information of the wireless power transmitter 300 by changing a connection state with at least one of an inductor or a capacitor of the matching circuit 323 through on/off control of a switch device included in the matching circuit 323.

According to an embodiment, when the communication circuit 330 includes the second communication circuit 332 capable of performing communication in the out-of-band manner, the second communication circuit 332 may communicate with the communication circuit 380 (e.g., a second communication circuit 382) of the wireless power receiver 350 by near field communication (NFC), Zigbee communication, infrared communication, visible light communication, Bluetooth communication, Bluetooth low energy (BLE) communication, or ultra-wideband (UWB) communication.

The above communication schemes of the communication circuit 330 are merely exemplary, and the scope of the disclosure is not limited to the specific communication scheme performed by the communication circuit 330 in the embodiments of the disclosure.

According to an embodiment, the wireless power receiver 350 (e.g., a wireless power reception device) may include a power reception circuit 370, a control circuit 352, the communication circuit 380 (including first and/or second communication circuits 381 and 382, respectively), the sensing circuit 355, storage circuit 356, and/or a display module 357 (including a display).

According to an embodiment, the power reception circuit 370 may receive power from the power transmission circuit 320 of the wireless power 5 transmitter 300. The power reception circuit 370 may be implemented in the form of a built-in battery or a power reception interface to receive power from the outside. The power reception circuit 370 may include a matching circuit 371, a rectifier circuit 372, a regulation circuit 373, switch circuit 374, a battery 375, and/or the conductive pattern 376.

According to an embodiment, the power reception circuit 370 may receive wireless power in the form of electromagnetic waves generated in correspondence with a current/voltage applied to the conductive pattern 324 of the power transmission circuit 320 through the conductive pattern 376. For example, the power reception circuit 370 may receive power using the conductive pattern 324 of the power transmission circuit 320 and an induced electromotive force formed in the conductive pattern 376 of the power reception circuit 370.

According to an embodiment, the matching circuit 371 may perform impedance matching. For example, power transmitted through the conductive pattern 324 of the wireless power transmitter 300 may be transmitted to the conductive pattern 376 to form an electromagnetic field. According to an embodiment, the matching circuit 371 may adjust the frequency band of the formed electromagnetic field (e.g., an electromagnetic field signal) by impedance adjustment. According to an embodiment, the matching circuit 371 may control input power received from the wireless power transmitter 300 through the conductive pattern 376 to have high efficiency and high output by the impedance adjustment. According to an embodiment, the matching circuit 371 may adjust an impedance based on the control of the control circuit 352. The matching circuit 371 may include at least one of an inductor (e.g., a coil), a capacitor, or a switch device. The control circuit 352 may control a connection state with at least one of the inductor or the capacitor through the switch device, and thus may perform impedance matching.

According to an embodiment, the rectifier circuit 372 may rectify the wireless power received at the conductive pattern 376 to a DC form, and may be implemented in the form of, for example, a bridge diode.

According to an embodiment, the regulation circuit 373 may convert the rectified power to a set gain. The regulation circuit 373 may include a DC/DC converter (not shown). For example, the regulation circuit 373 may convert the rectified power so that the voltage of an output terminal becomes 5V. Alternatively, a minimum/low value or a maximum/high value of a voltage applicable to a front end of the regulation circuit 373 may be set.

According to an embodiment, a switch circuit 374 may connect the regulation circuit 373 to the battery 375. According to an embodiment, the switch circuit 374 may maintain an on/off state under the control of the control circuit 352.

According to an embodiment, the battery 375 may be charged by receiving the power from the regulation circuit 373.

According to an embodiment, the sensing circuit 355 may sense a change in the state of the power received at the wireless power receiver 350. For example, the sensing circuit 355 may periodically or aperiodically measure a current/voltage value received by the conductive pattern 376 through a predetermined current/voltage sensor (not shown). According to an embodiment, the wireless power receiver 350 may calculate the amount of power received at the wireless power receiver 350 based on the current/voltage measured through the predetermined current/voltage sensor (not shown). According to an embodiment, the sensing circuit 355 may sense a change in the charging environment of the wireless power receiver 350. For example, the sensing circuit 355 may periodically or aperiodically measure at least one of an internal temperature or an external temperature of the wireless power receiver 350 through a predetermined temperature sensor (not shown).

According to an embodiment, the display module 357 may display overall information related to the charging state of the wireless power receiver 350. For example, the display module 357 may display at least one of a total battery capacity of the wireless power receiver 350, a remaining battery capacity, a battery charged amount, a battery usage, or an expected charging time.

According to an embodiment, the communication circuit 380 may communicate with the wireless power transmitter 300 in a predetermined method. The communication circuit 380 may perform data communication with the communication circuit 330 of the wireless power transmitter 300. According to an embodiment, the communication circuit 380 may operate in the same manner as or in a similar manner to the communication circuit 330 of the wireless power transmitter 300.

According to an embodiment, the control circuit 352 may transmit charging setting information for receiving a required power amount based on information related to the battery state of the wireless power receiver 350 to the wireless power transmitter 300 through the communication circuit 380. For example, when the control circuit 352 identifies the wireless power transmitter 300 capable of transmitting wireless power, the control circuit 352 may transmit charging setting information for receiving a required power amount based on at least one of the total battery capacity of the wireless power receiver 350, a remaining battery capacity, the number of charging times, a battery usage, a charging mode, a charging method, or a wireless reception frequency band to the wireless power transmitter 300 through the communication circuit 380.

According to an embodiment, the control circuit 352 may transmit power amount control information for controlling the amount of power received from the wireless power transmitter 300 according to a change in the amount of power charged in the wireless power receiver 350 to the wireless power transmitter 300 through the communication circuit 380.

According to an embodiment, the control circuit 352 may transmit environmental information according to a change in the charging environment of the wireless power receiver 350 to the wireless power transmitter 300 through the communication circuit 380. For example, when a temperature data value measured by the sensing circuit 355 is equal to or greater than a set temperature threshold, the control circuit 352 may transmit the measured temperature data to the wireless power transmitter 300.

Although the wireless power transmitter 300 and the wireless power receiver 350 are shown in FIG. 3 as including only the power transmission circuit 320 and the power reception circuit 370, respectively, each of the wireless power transmitter 300 and the wireless power receiver 350 may include both the power transmission circuit 320 and the power reception circuit 370. Accordingly, the wireless power transmitter 300 and the wireless power receiver 350 According to an embodiment may perform the functions of both a power transmitter and a power receiver. Each embodiment herein may be used in combination with any other embodiment herein.

Figure 4:
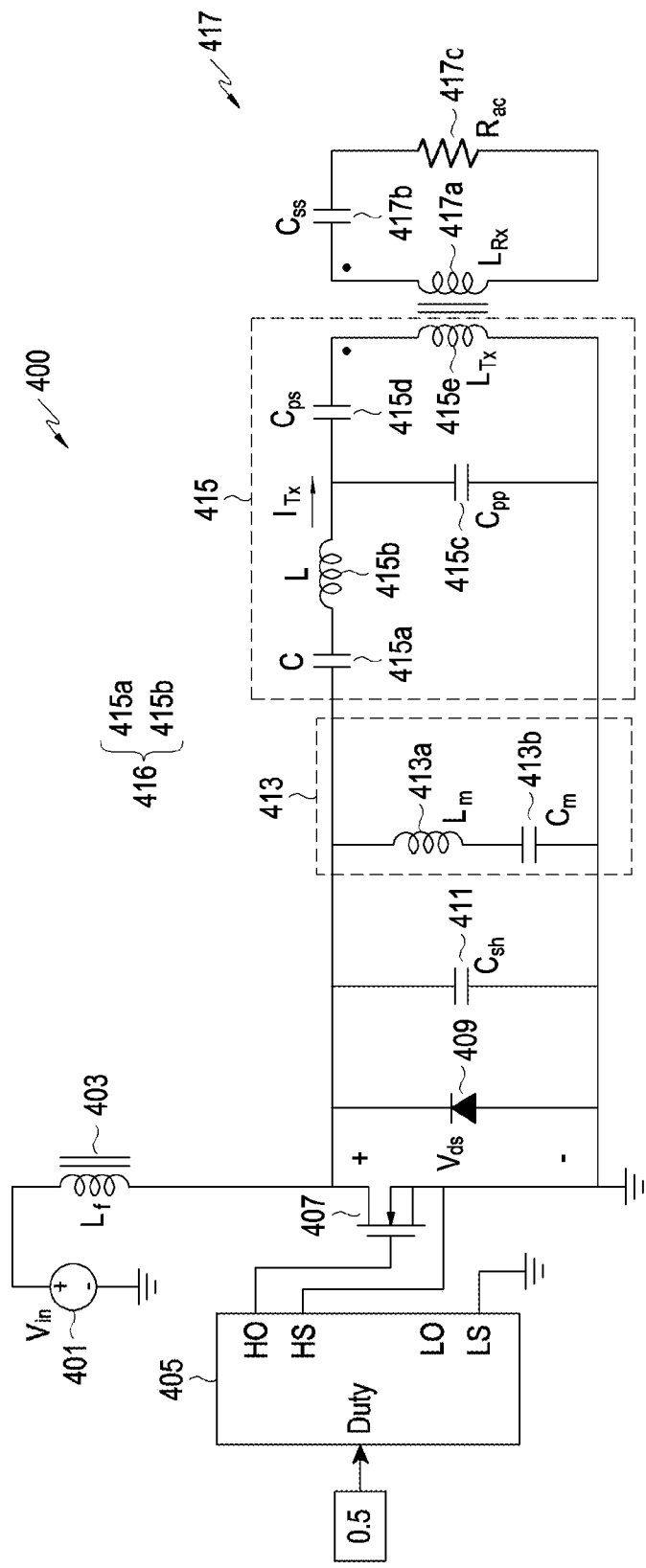
FIG. 4 is a diagram illustrating components of an electronic device according to an example embodiment.

FIG. 4 is a diagram illustrating components of an electronic device 400 (e.g., the wireless power transmitter 300 of FIG. 3) According to an embodiment.

According to an embodiment, the electronic device 400 may include an input power supply 401 (e.g., the power adapter 321 of FIG. 3), an RF choke inductor 403, and a gate driver 405 (e.g., a gate driving device), a power amplifier (PA) 407, a first capacitor $C_s$h 411, a first LC resonant circuit 413, a matching circuit 415 (e.g., the matching circuit 323 of FIG. 3), and a load network 417 (e.g., network including a third inductor 417a, a fourth capacitor 417b, and a load 417c). According to an embodiment, the electronic device 400 may further include a diode 409 connected in parallel to the PA 407.

According to an embodiment, the PA 407 may operate by receiving a DC voltage as a driving voltage from the input power supply 401. According to an embodiment, the PA 407 may be turned on or off by receiving an input signal in the form of a pulse (e.g., a square wave) from the gate driver 405 through an input terminal (e.g., a gate). According to an embodiment, the PA 407 may include a MOSFET. According to an embodiment, RF power may be generated based on the PA 407 being turned on or off by receiving the input signal from the gate driver 405.

According to an embodiment, the RF choke inductor 403 may be described equally as the RF choke inductor 3 of FIG. 1. According to an embodiment, the first capacitor 411 may be described equally as the shunt capacitor 9 of FIG. 1. According to an embodiment, a third inductor 417a, a fourth capacitor 417b, and a load 417c may be described equally as the third inductor 25a, the third capacitor 25b, and the load 25c of FIG. 2.

According to an embodiment, the matching circuit 415 may include a second LC resonant circuit 416 including a first capacitor C 415a and a first inductor L 415b, a second capacitor $C_{PP}$ 415c, a third capacitor $C_{PS}$ 415d, and/or a second inductor $L_{TX}$ 415e.

According to an embodiment, the second LC resonant circuit 416 may have one end connected to an output terminal of the PA 407 and one end of the first LC resonant circuit 413, and the other end connected to the second capacitor 415c and the third capacitor 415d.

According to an embodiment, the first LC resonant circuit 413 may be described equally as the first LC resonant circuit 11 of FIG. 1. For example, a fourth inductor 413a and a fourth capacitor 413b may be configured to have appropriate elements value such that the resonance frequency of the first LC resonant circuit 413 corresponds to the second harmonic frequency $2f_s$ of the operating frequency $f_s$ of the input signal. According to an embodiment, the element values of the fourth inductor 413a and the fourth capacitor 413b may have a relationship as described in Equation 3.

$$C_m = \frac{1}{k_m w_s^2 L_m} \qquad \text{[Equation 3]}$$

Referring to Equation 3, $C_m$ may represent the capacitance value of the fourth capacitor 413b, $L_m$ may represent the inductance value of the fourth inductor 413a, and $w_s$ may represent $2\pi f_s$ ($f_s$ represents the operating frequency of the input signal). As described above, when the resonance frequency of the first LC resonant circuit 413 corresponds to the second harmonic frequency $2f_s$ of the operating frequency $f_s$ of the input signal, $k_m$ may be determined to be 4. However, $k_m$ may be appropriately determined to be a value other than 4.

According to an embodiment, the first capacitor 415a and the first inductor 415b may be connected to each other in series.

According to an embodiment, a current $I_{TX}$ flowing in the matching circuit 415 (e.g., a current output from the second LC resonant circuit 416), an input voltage $V_{in}$ (e.g., a DC voltage), and the inductance value L of the inductor 415b may have a relationship as described in Equation 4.

$$I_{TX} \propto \frac{V_{in}}{L} \quad \text{[Equation 4]}$$

Referring to Equation 4, the current $I_{TX}$ may be inversely proportional to the inductance value L of the first inductor 415b.

When the inductance value L of the first inductor 415b is less than a certain magnitude, a second or higher harmonic frequency impedance is small, and thus the second or higher harmonic component of the generated RF power may pass through the second LC resonant circuit 416 and cause distortion of the waveform of an output voltage (e.g., a drain-source voltage $V_{ds}$) of the PA 407.

According to an embodiment, the inductance value L of the first inductor 415b may be determined to be a value that leads to an impedance of the second LC resonant circuit 416 equal to or greater than a first predetermined magnitude (e.g., j50) at at least one second or higher harmonic frequency (e.g., a third harmonic frequency). For example, an inductance value $L_1$ of part of the first inductor 415b, which will be described later, may be determined to be a value that leads to an impedance of the part of the first inductor 415b equal to or greater than a second predetermined magnitude (e.g., j20) at the at least one second or higher harmonic frequency (e.g., a third harmonic frequency). According to an embodiment, the first predetermined magnitude and/or the second predetermined magnitude will be described in more detail with reference to the drawings to be described later. According to an embodiment, based on the impedance of the second LC resonant circuit 416 being set to at least one second or higher order, and/or the impedance of the part of the first inductor 415b being set to the second predetermined magnitude or higher, the degree to which the second or higher harmonic component of the RF power generated by the PA 407 passes through the second LC resonant circuit 416 may decrease, thereby alleviating the waveform distortion of the output voltage (e.g., the drain-source voltage $V_{ds}$) of the PA 407.

According to an embodiment, at least part of the second LC resonant circuit 416 may be configured to have a resonance frequency corresponding to the operating frequency $f_s$ of the input signal. For example, the part of the first inductor 415b and the first capacitor 415a connected to each other in series may be configured to have a resonance frequency $f_r$ corresponding to the operating frequency $f_s$.

More specifically, the first inductance value $L_1$ of the part of the first inductor 415b may be determined by Equation 5.

$$f_r(=f_s) = \frac{1}{2\pi\sqrt{L_1 C}} \quad \text{[Equation 5]}$$

According to an embodiment, the part of the first inductor 415b may be determined to have the inductance value $L_1$ which leads to at least one harmonic impedance equal to or greater than the above-described second predetermined magnitude, and a resonance frequency corresponding to the operating frequency $f_s$ with the first capacitor 415a.

According to an embodiment, the remaining part of the first inductor 415b and the second capacitor 415c may be configured to have the resonance frequency $f_r$ corresponding to the operating frequency $f_s$. For example, a second inductance value $L_2$ of the remaining part of the first inductor 415b and the capacitance value $C_{pp}$ of the second capacitor 415c may have the relationship described in the foregoing Equation 1.

According to an embodiment, the first inductor 415b may be implemented as a single inductor corresponding to an inductance value L that is the sum of the first inductance value $L_1$ and the second inductance value $L_2$ described above. According to an embodiment, the first inductor 415b may be implemented in a structure in which an inductor corresponding to the above-described first inductance value $L_1$ and an inductor corresponding to the second inductance value $L_2$ are connected to each other in series.

Compared to the LCC inverter 20 including two transistors in FIG. 2, the electronic device 400 of FIG. 4 may be implemented to include one PA (or transistor). The electronic device 400 of FIG. 4 may include the matching circuit 415 (e.g., a CLCC network), while using a relatively small number of elements (e.g., transistors), and thus may be robust against the proximity of a metal. In addition, because the electronic device 400 uses elements that allow the second LC resonant circuit 416 (or at least part of the first inductor 415b) to have a harmonic impedance of a predetermined magnitude or higher, thereby solving the problem of the distorted waveform of the output voltage (e.g., the drain-source voltage $V_{ds}$) of the PA 407.

Figure 5:
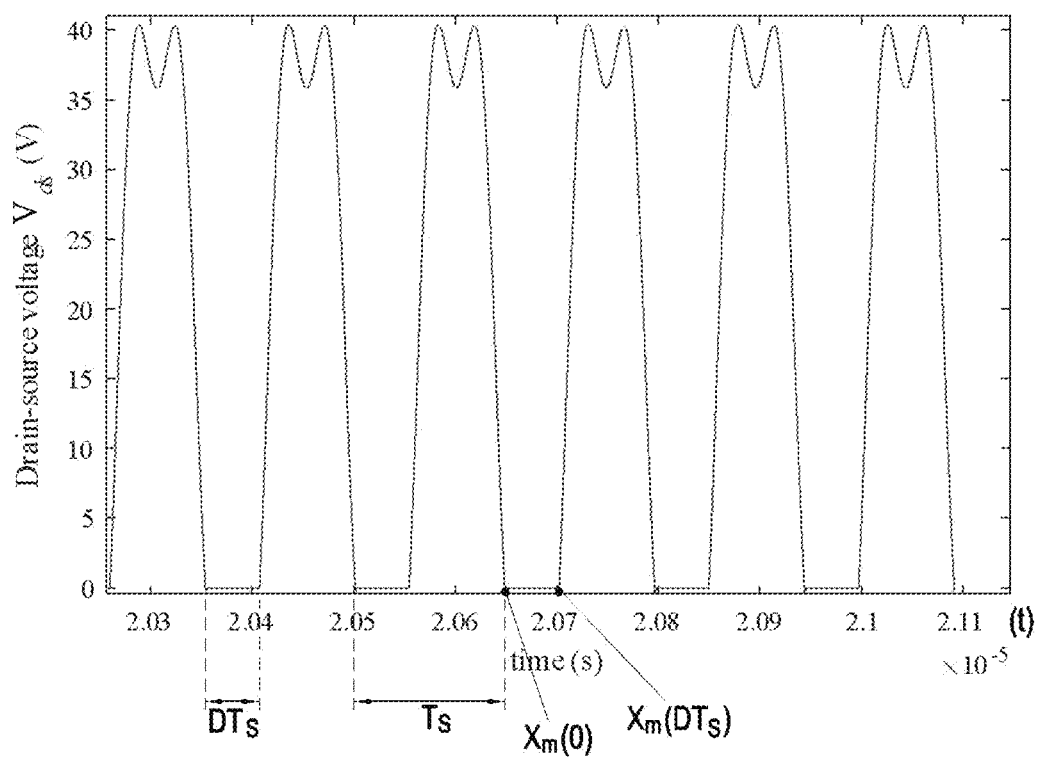
FIG. 5 is a diagram illustrating the time-domain waveform of an output voltage of a power amplifier (PA) according to an example embodiment.

FIG. 5 illustrates a time-domain waveform of an output voltage (e.g., Vas in FIG. 4) of a PA (e.g., the PA 407 of FIG. 4) According to an embodiment. FIGS. 6A to 6D illustrate normalized fundamental components (e.g., first harmonic components) of the output voltage Vas of the PA 407 According to an embodiment.

Referring to FIG. 5, '$T_s$' represents a switching period, '$DT_s$' represents the duration of a period during which the PA 407 is in the on state within one switching period, and Xm(k) (k is one of time 0 to time $T_s$) represents the magnitude (e.g., switching waveform) of a sampling value of the output voltage Vas at an $m^{at}$ switching, when t=k.

According to an embodiment, $X_m(t_n)$ (n is a sampling number) and $Xm(t_{n+1})$ may have a relationship as described in Equation 6 to Equation 14.

$$X_m(t_{n+1}) = X_m(t_n)e^{Adt_s} + A(e^{Adt_s} - 1)B \quad \text{[Equation 6]}$$

$$x(t) = [V_{ds}, V_m, V_s, V_{pp}, V_{ps}, I_f, I_m, I_s, I_{pp}, I_{tx}]^T \quad \text{[Equation 7]}$$

-continued $$A = \begin{bmatrix} \frac{-1}{R_{ds}C_{ds}} & 0 & 0 & 0 & 0 & \frac{1}{C_{ds}} & \frac{-1}{C_{ds}} & \frac{-1}{C_{ds}} & 0 & 0 \\ 0 & 0 & 0 & 0 & 0 & 0 & \frac{1}{C_m} & 0 & 0 & 0 \\ 0 & 0 & 0 & 0 & 0 & 0 & 0 & \frac{1}{C} & 0 & 0 \\ 0 & 0 & 0 & 0 & 0 & 0 & 0 & 0 & \frac{1}{C_{pp}} & 0 \\ 0 & 0 & 0 & 0 & 0 & 0 & 0 & 0 & 0 & \frac{1}{C_{ps}} \\ \frac{-1}{L_f} & 0 & 0 & 0 & 0 & 0 & \frac{-R_{Lf}}{L_f} & 0 & 0 & 0 \\ \frac{1}{L_m} & \frac{-1}{L_m} & 0 & 0 & 0 & 0 & 0 & \frac{-R_{Lm}}{L_f} & 0 & 0 \\ \frac{L_2+L-tx}{\alpha} & 0 & \frac{-(L_2+L_{tx})}{\alpha} & \frac{L_{tx}}{\alpha} & \frac{-L_2}{\alpha} & 0 & 0 & \frac{-R_{L1}}{L_1} & 0 & 0 \\ \frac{L_{tx}}{\alpha} & 0 & \frac{-L_{tx}}{\alpha} & \frac{-(L_1+L_{tx})}{\alpha} & \frac{-L_1}{\alpha} & 0 & 0 & 0 & 0 & 0 \\ \frac{L_2}{\alpha} & 0 & \frac{-L_2}{\alpha} & \frac{-L_1}{\alpha} & \frac{-(L_1+L_2)}{\alpha} & 0 & 0 & 0 & 0 & \frac{(-(R_L+R_{tx}))}{(L_{tx})} \end{bmatrix}$$ [Equation 8]

$$\alpha = L_2L_1 + L_2L_{tx} + L_{tx}L_1$$ [Equation 9]

$$B = \left[0, 0, 0, 0, 0, \frac{V_{in}}{L_f}, 0, 00, 0\right]^T$$ [Equation 10]

$$X_{m+1}(0) = X_m(T_s), (m = 0, 1, 2, \ldots, m_{ss})$$ [Equation 11]

$$X_0(0) = 0$$ [Equation 12]

$$X_{m_{ss}}(0) = X_{m_{ss}-1}(0)$$ [Equation 13]

$$t_{n+1} = t_n + dt_s, \left(n = 0, 1, 2, \ldots, N-1, \&N = cell\left\{\frac{T_s}{dt_s}\right\}\right)$$ [Equation 14]

In the above equations, $V_{ds}$ represents the output voltage of the PA 407, $V_m$ represents a voltage across the first LC resonant circuit 413, $V_s$ represents a voltage across the second LC resonant circuit 416, $V_{pp}$ represents a voltage across the second capacitor 415c, $V_{ps}$ represents a voltage across the third capacitor 415d, $I_f$ represents a current flowing through the RF choke inductor 403, $I_m$ represents a current flowing in the first LC resonant circuit 413, $I_s$ represents a current flowing in the second LC resonant circuit 416, $I_{pp}$ represents a current flowing in the second capacitor 415c, and $I_{tx}$ represents a current flowing in the second inductor 415e. $L_1$ represents the inductance value (e.g., the first inductance value) of part of the first inductor 415b, $L_2$ represents the inductance value (e.g., the second inductance value) of the remaining part of the first inductor 415b, $L_{tx}$ represents the inductance value of the second inductor 415e, $C_{ds}$ represents the sum $C_{sh}+C_{mosfet}$ of the capacitance value $C_{sh}$ of the first capacitor 411 and the parasitic capacitance $C_{mosfet}$ of the PA 407, $L_f$ represents the inductance value of the RF choke inductor 403, $C_m$ represents the capacitance value of the fourth capacitor 413b, C represents the capacitance value of the first capacitor 415a, $C_{pp}$ represents the capacitance value of the second capacitor 415c, $C_{ps}$ represents the capacitance value of the third capacitor 415d, and $L_m$ represents the inductance value of the fourth inductor 413a. "$R_k$" represents the internal resistance of each element corresponding to the subscript k. $R_L$ represents the equivalent resistance value of the load network 417. $R_{ds}$ is the drain-source resistance of the PA 407 (e.g., a transistor), which may be about 10 mΩ while the PA 407 is in the on state (e.g., $0 \le t_n < DT_s$), and about 1 SΩ while the PA 407 is in the off state (e.g. $t_n > DT_s$). $V_{in}$ represents the voltage value of the input power supply 401. m represents a switching order, and $m_{ss}$ represents a switching order until a steady state. $t_0$ may be zero, and $t_N$ may be equal to $T_s$. Based on Equation 6 to Equation 14 described above, the elements values of the elements illustrated in FIG. 4 may be determined.

According to an embodiment, the elements values of the fourth inductor 413a and the fourth capacitor 413b included in the first LC resonant circuit 413 may have a relationship as described in Equation 3.

According to an embodiment, the sum $C_{ds}$ of the capacitance value $C_{sh}$ of the first capacitor 411 and the parasitic capacitance value $C_{mosfet}$ of the PA 407 and the inductance value of the RF choke inductor 403 may have a relationship as described in Equation 15. For example, although $K_c$ may be determined to be 2, $K_c$ may also be appropriately determined to be a value other than 2.

$$C_{ds} = \frac{1}{k_c w_s^2 L_f}$$ [Equation 15]

According to an embodiment, the inductance value (e.g., the first inductance value) of the part of the first inductor 415b and the capacitance value of the first capacitor 415a may has a relationship as described in Equation 16. For example, the part of the first inductor 415b and the first capacitor 415a may operate as a primary filter at the operating frequency $f_s$. $C_{ds}$ is given by $$C_{ds} = \frac{1}{w_s^2 L_1}$$ [Equation 16]

According to an embodiment, the inductance value (e.g., the second inductance value) of the remaining part of the first inductor 415b, the inductance value of the second inductor 415e, and the capacitance value of the third capacitor 415d may have a relationship as described in Equation 17.

$$C_{ps} = \frac{1}{w_s^2(L_{tx} - L_2)}$$ [Equation 17]

For example, when the inductance value (e.g., the second inductance value $L_2$) of the remaining part of the first inductor 415b is designed within a range of 20 pH to 100 pH, the inductance value $L_f$ of the second inductor 415e is designed within a range of 100 nH to 500 nH, the inductance value (e.g., the first inductance value $L_1$) of the part of the first inductor 415b is designed within a range of $0.1L_f$ to $3L_f$, and the inductance value $L_m$ of the fourth inductor 413a is designed within a range of $0.1L_f$ to $3L_f$, a simulation result as illustrated in FIG. 6 to be described later may be derived. However, the above design ranges are exemplary, and the above element values may be determined within different design ranges depending on implementation.

Referring to FIGS. 6A to 6D, $L_m/L_f$ represents a value $n_m$ obtained by normalizing the inductance value $L_m$ of the fourth inductor 413a to the inductance value $L_f$ of the second inductor 415e, $L_1/L_f$ represents a value $n_s$ obtained by normalizing the inductance value (e.g., the first inductance value $L_1$) of part of the first inductor 415b to the inductance value $L_f$ of the second inductor 415e. $V_{ds1}$ represents the ratio of a first harmonic component $V_{ds,1st}$ to the output voltage Vas of the PA 407, and may be defined by Equation 18. In Equation 18, Max{$V_{ds}$} represents a maximum value of the output voltage $V_{ds}$ of the PA 407.

$$V_{ds1} = \frac{V_{ds,1st}}{Max\{V_{ds}\}}$$ [Equation 18]

According to an embodiment, the inductance value $L_m$ of the fourth inductor 413a and the inductance value (e.g., the first inductance value L1) of the part of the first inductor 415b may be determined based on a zero-voltage switching (ZVS) condition and a set value $c_{ds1}$ of $V_{ds1}$. For example, although the set value $c_{ds1}$ of $V_{ds1}$ may be determined to be 0.58, it may be determined to be a value other than 0.58 depending on implementation.

Referring to FIGS. 6A to 6D, a graph is illustrated on the left side, which shows the magnitudes of $V_{ds1}$ in different colors according to the value $n_m$ obtained by normalizing the inductance value $L_m$ of the fourth inductor 413a to the inductance value $L_f$ of the second inductor 415e, and the value $n_s$ obtained by normalizing the inductance value (e.g., the first inductance value $L_1$) of the part of the first inductor 415b to the inductance value $L_f$ of the second inductor 415e. For example, the magnitude of $V_{ds1}$ may be described as a function value for the normalized values $n_m$ and $n_s$.

The values of $V_{ds1}$ shown in colors in the left drawing correspond to cases in which the ZVS condition of the PA 407 is satisfied. For example, the ZVS condition of the PA 407 may be given as Equation 19. $V_{ds}(T_s)$ represents the magnitude of the output voltage $V_{ds}$, when the PA 407 is turned on ($t=T_s$) within a switching period.

$$V_{ds}(T_s)\left(\frac{L_1}{L_f}, \frac{L_m}{L_f}\right) \le 0$$ [Equation 19]

The magnitudes of $V_{ds1}$ corresponding to the colors of the left drawing are shown on the right side.

According to an embodiment, the first inductance value $L_1$ and the inductance value $L_m$ of the fourth inductor 413a may be determined to be the smallest values that satisfy Equation 20 among values that lead to the magnitudes of $V_{ds1}$ equal to or greater the set value $c_{ds1}$, when the above-described ZVS condition is satisfied.

$$V_{ds1}\left(\frac{L_1}{L_f}, \frac{L_m}{L_f}\right) \ge c_{ds1}$$ [Equation 20]

Figure 6A:
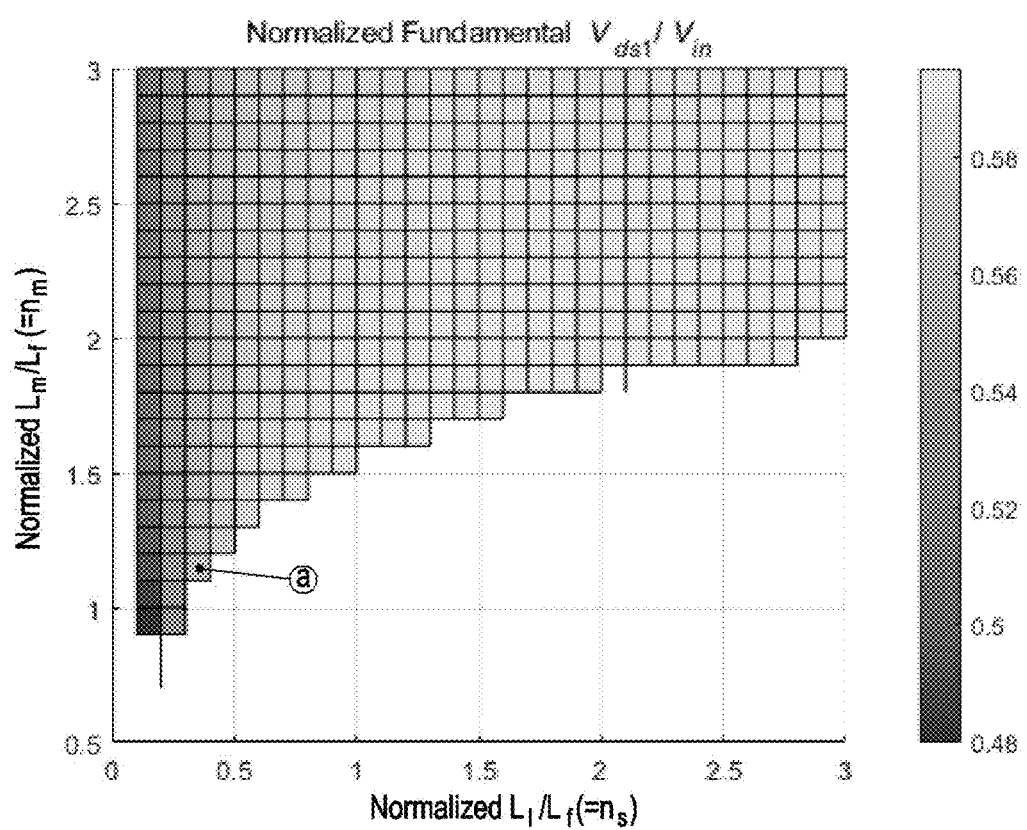
FIGS. 6A, 6B, 6C, and 6D are diagrams illustrating normalized fundamental components of an output voltage of a PA according to an example embodiment.
Figure 6B:
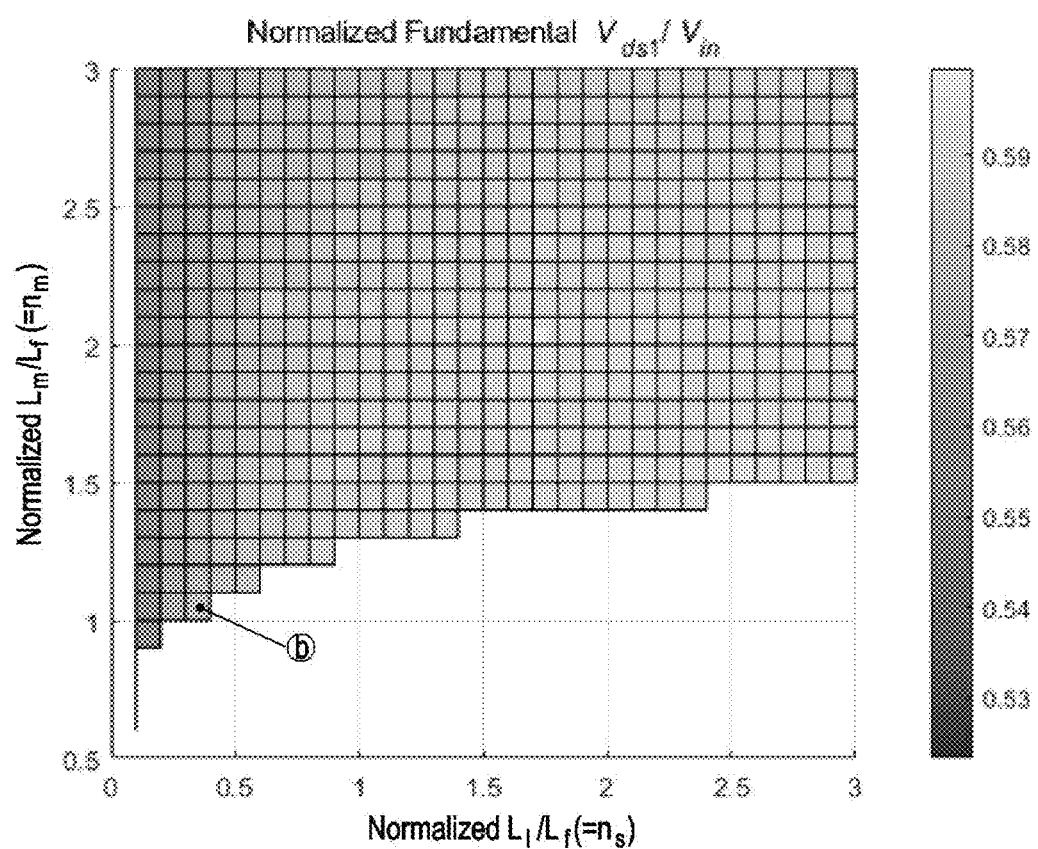
Figure 6C:
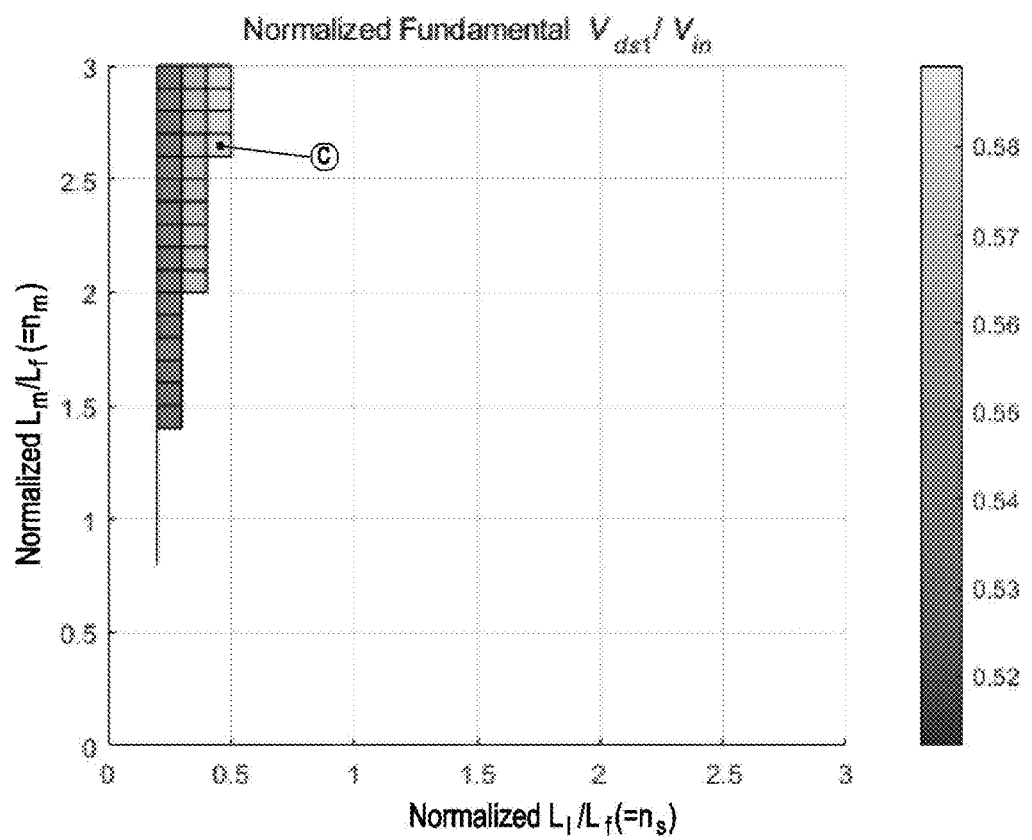
Figure 6D:
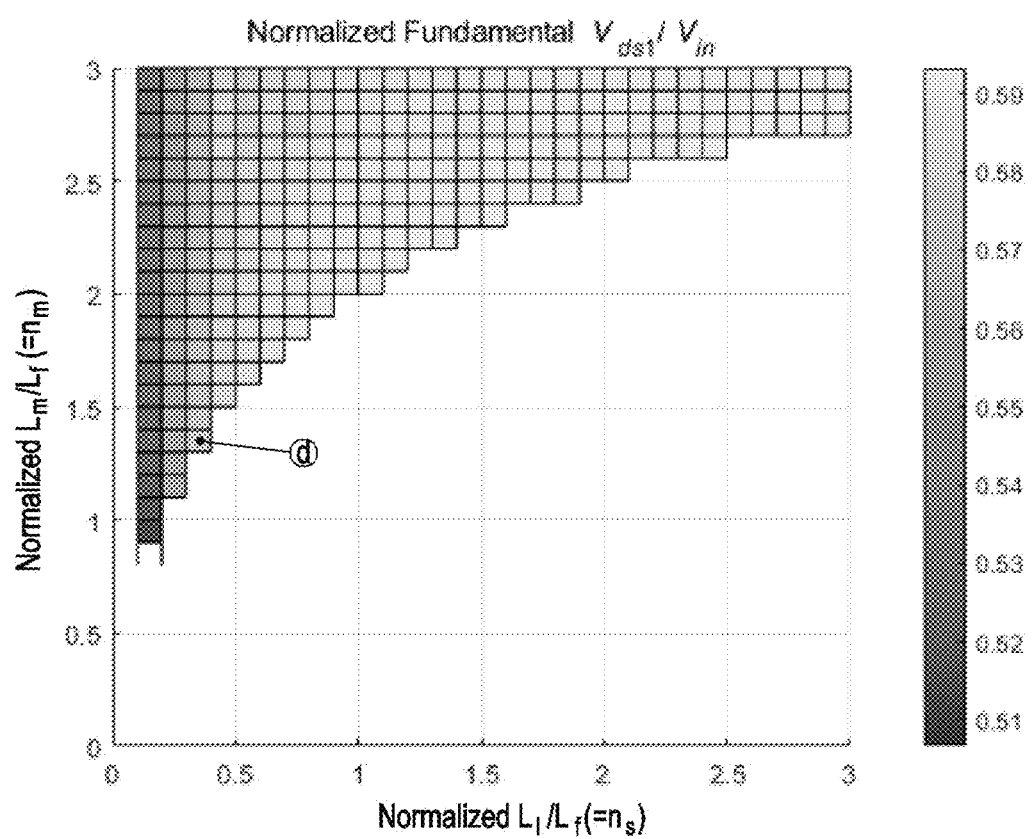

Referring to FIGS. 6A to 6D, FIG. 6A illustrates a case in which the inductance value $L_f$ of the second inductor 415e is 100 nH, and the inductance value (e.g., the second inductance value $L_2$) of the remaining part of the first inductor 415b is 25 nH. FIG. 6B illustrates a case in which the inductance value $L_f$ of the second inductor 415e is 100 nH, and the second inductance value $L_2$ is 501 nH. FIG. 6C illustrates a case in which the inductance value $L_f$ of the second inductor 415e is 200 nH and the second inductance value $L_2$ is 25 nH. FIG. 6D illustrates a case in which the inductance value $L_f$ of the second inductor 415e is 200 nH, and the second inductance value $L_2$ is 50 nH.

For example, referring to FIG. 6A, when the set value $c_{ds1}$ is determined to be 0.58, the range of $n_s$ satisfying Equation 20 may be about 0.4 or larger. The first inductance value $L_1$ may be determined to be $0.4L_f$, which is an inductance value when the minimum or low value of $n_s$ is 0.4. $n_m$ may be determined in the range of about 1.3 or larger, satisfying the condition that when $n_s$ is the minimum value, 0.4, the magnitude of $V_{ds1}$ is equal to or greater than the set value $c_{ds1}$ of 0.58. The inductance value $L_m$ of the fourth inductor 413a may be determined to be $1.3L_f$, which is the inductance value when the minimum value of $n_m$ is about 1.3. Accordingly, the first inductance value $L_1$ and the inductance value $L_m$ of the fourth inductor 413a may be determined from $n_s$ and $n_m$ corresponding to ⓐ illustrated in FIG. 6A.

For example, in FIG. 6B, FIG. 6C, and/or FIG. 6D, similarly to the above paragraph, the minimum/low values of $n_s$ and $L_1$ may be determined in a range in which the magnitude of $V_{ds1}$ is equal to or greater than the set value $c_{ds1}$ of 0.58, and the minimum values of $n_m$ and $L_m$ may be determined from the minimum values of $n_s$ and $L_1$ (e.g., ⓑ in FIG. 6B, ⓒ in FIG. 6C, and ⓓ in FIG. 6D).

Compared to FIGS. 6A and 6B (or FIGS. 6C and 6D), it may be noted that as the second inductance value $L_2$ is larger, the range of $n_s$ (or $L_1$) that may be determined based on the ZVS condition of the PA 407 and the set value $c_{ds1}$ of $V_{ds1}$ is wider (or the minimum value of $n_s$ (or $L_1$) that may be determined is smaller). Compared to FIGS. 6A and 6C (or FIGS. 6B and 6D), it may be noted that as the inductance value $L_f$ of the second inductor 415e is larger, the range of $n_s$ (or $L_1$) that may be determined based on the ZVS condition of the PA 407 and the set value $c_{ds1}$ of $V_{ds1}$ is narrower (or the minimum value of $n_s$ (or $L_1$) that may be determined is greater).

According to an embodiment, a decidable maximum value of the first inductance value $L_1$ may be determined based on a design range of the inductance value $L_m$ of the fourth inductor 413a. For example, in the case of FIG. 6A, when a maximum value set during design of the inductance value $L_m$ of the fourth inductor 413a is $1.5L_f$, about $0.8L_f$ satisfying the ZVS condition of the PA 407 and the condition of the set value $c_{ds1}$ of $V_{ds1}$ may be determined as a designable maximum or high value of the first inductance value $L_1$.

Figure 7A:
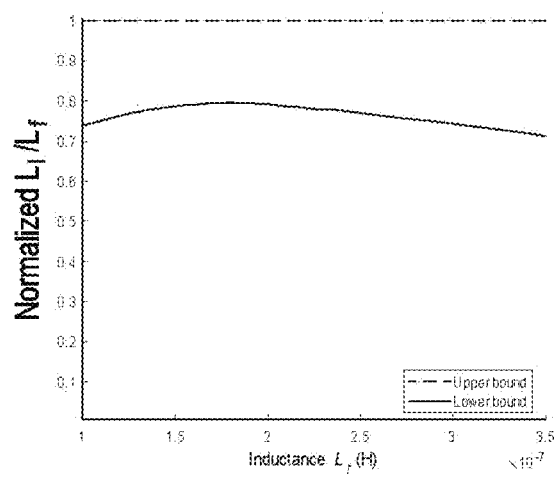
FIGS. 7A, 7B and 7C are diagrams illustrating designable inductance value ranges for inductors in a PA according to an example embodiment.
Figure 7A:
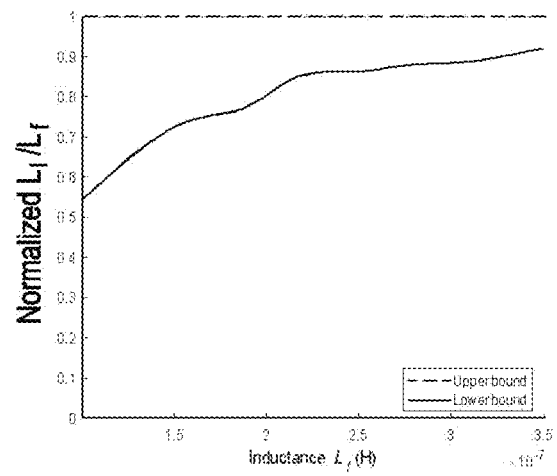
Figure 7B:
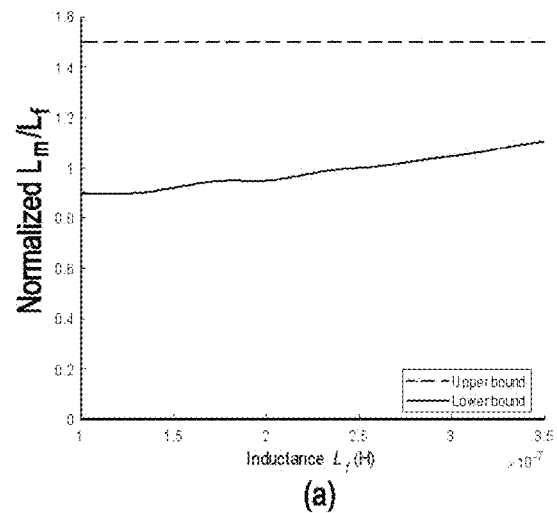
Figure 7B:
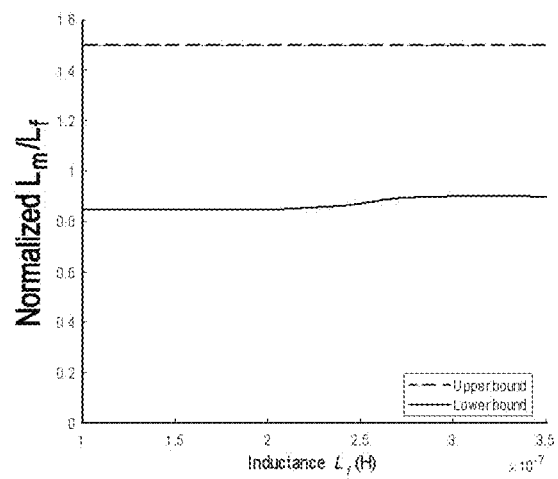
Figure 7C:
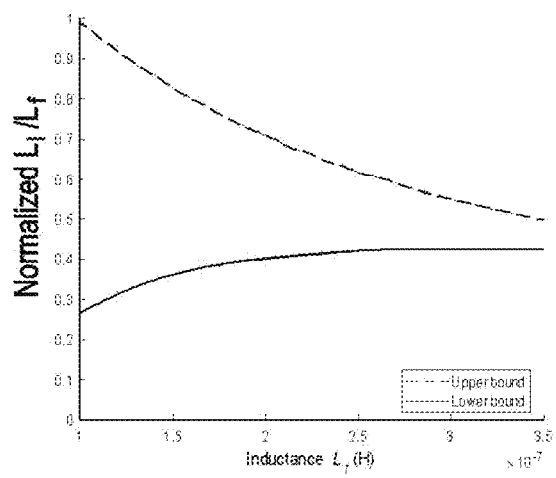
Figure 7C:
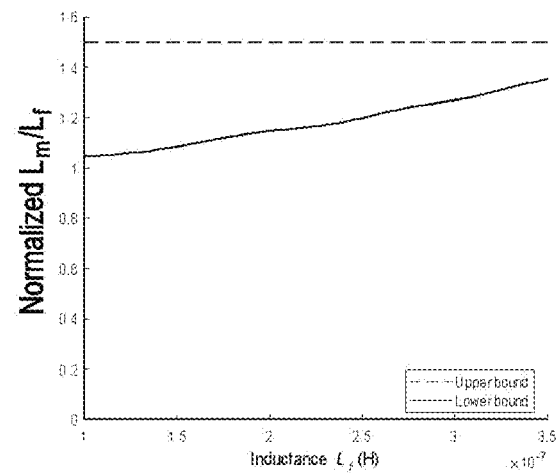

FIGS. 7A, 7B and 7C are diagrams illustrating designable ranges for the first inductance value $L_1$ or the inductance value $L_m$ of the fourth inductor 413a according to the second inductance value $L_2$ and/or a $K_c$ value.

According to an embodiment, the first inductance value $L_1$ or the inductance value $L_m$ of the fourth inductor 413a may be determined based on the ZVS condition of the PA 407 and the set value $c_{ds1}$ of $V_{ds1}$. Referring to FIG. 7A, for a $K_c$ value of 2, a designable range for the first inductance value $L_1$ according to the second inductance value $L_2$ is illustrated. Referring to FIG. 7A(a) and FIG. 7A(b), it may be noted that as the second inductance value $L_2$ is larger (e.g., when the second inductance value $L_2$ is 70 nH (FIG. 7A(b)) rather than when the second inductance value $L_2$ is 40 nH (FIG. 7A(a)), a minimum value (or a lower bound) that may be determined as the first inductance value $L_1$ is smaller.

Referring to FIG. 7B, for a $K_c$ value of 2, a designable range for the inductance value $L_m$ of the fourth inductor 413a according to the second inductance value $L_2$ is illustrated. Referring to FIGS. 7B(a) and 7B(b), it may be noted that as the second inductance value $L_2$ is larger (e.g., when the second inductance value $L_2$ is 70 nH (FIG. 7B(b)) rather than the second inductance value $L_2$ is 40 nH (FIG. 7B(a)), a minimum value (or a lower bound) that may be determined as the inductance value $L_m$ of the fourth inductor 413a is smaller.

Referring to FIG. 7C, for a $K_c$ value of 1.8, a designable range for the first inductance value $L_1$ (FIG. 7C(a)) and a designable range for the inductance value $L_m$ of the fourth inductor 413a (FIG. 7C(b)) according to the second inductance value $L_2$ are illustrated. Referring to FIG. 7A(a) and FIG. 7C(a), or FIG. 7B(a) and of FIG. 7C(b), it may be noted that as the $K_c$ value is smaller (e.g., FIG. 7C(a) rather than FIG. 7A(a) or FIG. 7C(b) rather than FIG. 7B(a)), a designable range for the first inductance value $L_1$ or the inductance value $L_m$ of the fourth inductor 413a is narrower.

Referring to FIGS. 7A, 7B and 7C, it may be noted that as the inductance value $L_f$ of the RF choke inductor 403 increases, a required first inductance value $L_1$ increases.

Figure 8A:
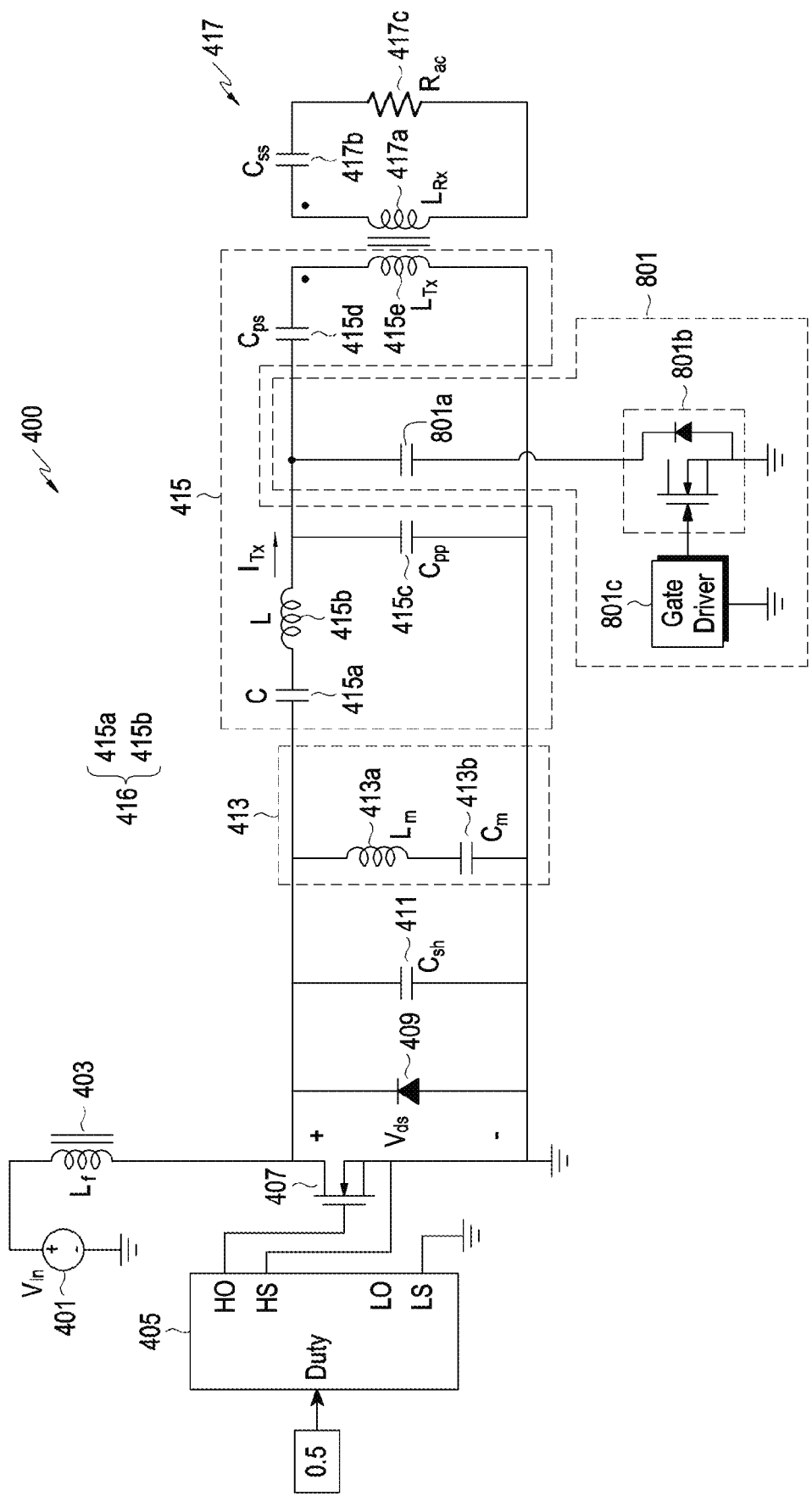
FIG. 8A is a diagram illustrating components of an electronic device according to an example embodiment.
Figure 8B:
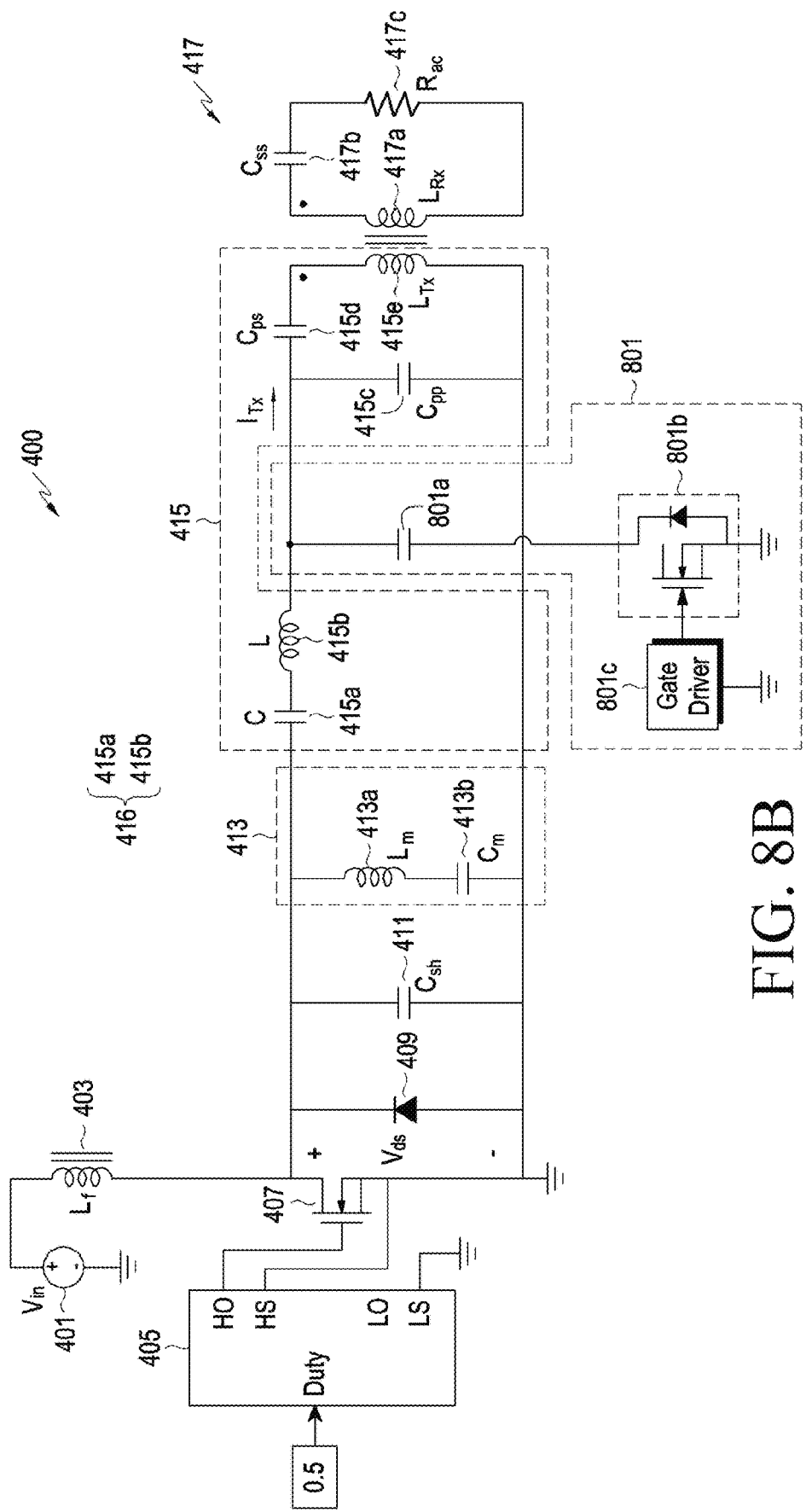
FIG. 8B is a diagram illustrating components of an electronic device according to an example embodiment.

FIG. 8A is a diagram illustrating components of the electronic device 400 According to an embodiment. FIG. 8B is a diagram illustrating components of the electronic device 400 According to an embodiment.

According to an embodiment, the electronic device 400 may include the input power supply 401, the RF choke inductor 403, the gate driver 405, the PA 407, the first capacitor $C_{sh}$ 411, the LC resonant circuit 413, the matching circuit 415, and the load network 417. According to an embodiment, the electronic device 400 may further include the diode 409 connected in parallel to the PA 407.

Referring to FIGS. 8A and 8B, According to an embodiment, the electronic device 400 may further include a switched capacitor tank 801. For example, the capacitor tank 801 may include a fifth capacitor 801a, a switch 801b, and a gate driver 801c. According to an embodiment, the fifth capacitor 801a may be connected to the second LC resonant circuit 416 (e.g., the second capacitor 415c). According to an embodiment, the switch 801b may include a transistor (e.g., a MOSFET). According to an embodiment, the switch 801b may further include a diode connected in parallel to the transistor. According to an embodiment, the gate driver 801c may control an on/off state of the switch 801b.

Referring to FIG. 8A, According to an embodiment, the switched capacitor tank 801 may be connected to the second LC resonant circuit 416, the second capacitor 415c, and the third capacitor 415d.

Referring to FIG. 8B, According to an embodiment, the switched capacitor tank 801 may be connected to the second LC resonant circuit 416 (e.g., the first inductor 415b). For example, the first inductor 415b may be implemented in a form in which an inductor corresponding to the first inductance value $L_1$ and an inductor corresponding to the second inductance value $L_2$ are connected to each other in series. The switched capacitor tank 801 may be connected between the inductor corresponding to the first inductance value $L_1$ and the inductor corresponding to the second inductance value $L_2$ (e.g., to a node in which the inductor corresponding to the first inductance value $L_1$ and the inductor corresponding to the second inductance value $L_2$ are connected to each other). According to an embodiment, the second capacitor 415c and the third capacitor 415d may be mounted on a Tx coil (not shown) of the electronic device 400. According to an embodiment, compared to the connection structure of FIG. 8A, since the switched capacitor tank 801 is connected between the inductor corresponding to the first inductance value $L_1$ and the inductor corresponding to the second inductance value $L_2$, the switched capacitor tank 801 may be more easily connected.

According to an embodiment, when the switch 801b is turned on, the fifth capacitor 801a may be connected in parallel to the second capacitor 415c of the matching circuit 415. According to an embodiment, an impedance $Z_{in}$ facing the second LC resonant circuit 416 may increase based on the fifth capacitor 801a being connected in parallel to the second capacitor 415c. According to an embodiment, upon detection of a decrease in the impedance $Z_{in}$, the electronic device 400 (e.g., the gate driver 801c) may control the switch 801b to the on state. For example, when a metal (e.g., a wireless power receiver) approaches the electronic device 400, the impedance $Z_{in}$ may decrease. The electronic device 400 may detect a change in the impedance $Z_{in}$ by sensing at least one of a current flowing through the first LC resonant circuit 413, a current flowing through the second LC resonant circuit 416, or a current flowing through the second inductor 415e. Upon detection of a decrease in the impedance $Z_{in}$ (e.g., to or below a third predetermined magnitude), the electronic device 400 may control the switch 801b to the on state, thereby increasing the decreased impedance $Z_{in}$. According to an embodiment, the electronic device 400 may identify whether a metal (e.g., a wireless power receiver) is in proximity using at least one sensor or a communication module, and when the metal (e.g., the wireless power receiver) is in proximity, control the switch 801b to the on state.

According to an embodiment, a wireless power transmitter (e.g., the wireless power transmitter 300 of FIG. 4) may include a PA (e.g., the PA 407 of FIG. 4) configured to output an amplified signal based on an input signal and a driving voltage, a first LC resonant circuit (e.g., the first LC resonant circuit 413 of FIG. 4) connected in parallel to the power amplifier, a matching circuit (e.g., the matching circuit 415 of FIG. 4), and a transmission coil connected to the matching circuit. The matching circuit may include a second LC resonant circuit (e.g., the second LC resonant circuit 416 of FIG. 4) including a first inductor (e.g., the first inductor 415b of FIG. 4) and a first capacitor (e.g., the first capacitor 415a of FIG. 4) connected in series to the first inductor, and having one end connected to an output terminal of the power amplifier and one end of the first LC resonant circuit, and a second capacitor (e.g., the second capacitor 415c of FIG. 5) and a third capacitor (e.g., the third capacitor 415d of FIG. 4) respectively connected to other end of the second LC resonant circuit. The first inductor may be configured to have an inductance value leading to an impedance of the second LC resonant circuit equal to or greater than a first predetermined magnitude at at least one second or higher harmonic frequency of an operating frequency of the input signal.

According to an embodiment, part of the first inductor may be configured to have an impedance value equal to or greater than a second predetermined magnitude at the at least one second or higher harmonic frequency.

According to an embodiment, the inductance value may be determined to be a sum of a first inductance value leading to a resonance frequency of part of the first inductor and the first capacitor, corresponding to an operating frequency, and a second inductance value leading to a resonance frequency of remaining part of the first inductor and the second capacitor, corresponding to the operating frequency.

According to an embodiment, the part of the first inductor may form a second inductor, and the remaining part of the first inductor may form a third inductor connected in series to the second inductor.

According to an embodiment, the second inductor may be connected in series to the first capacitor.

According to an embodiment, the third inductor may be connected to the second capacitor and the third capacitor.

According to an embodiment, the first LC resonant circuit may include a fourth inductor (e.g., the fourth inductor 413a of FIG. 4) and a fourth capacitor (e.g., the fourth capacitor 413b of FIG. 4) connected (directly or indirectly) in series to each other, and a resonance frequency of the first LC resonant circuit may be set to correspond to a second harmonic frequency of the operating frequency.

According to an embodiment, the wireless power transmitter may further include a shunt capacitor (e.g., the shunt capacitor 411 of FIG. 4) connected (directly or indirectly) in parallel to the power amplifier and the first LC resonant circuit, respectively.

According to an embodiment, the PA may include a transistor, and the first predetermined magnitude may be determined in a range satisfying a first condition that a voltage across the transistor is less than or equal to zero, and a second condition that a ratio of a fundamental component of the voltage across the transistor is equal to or greater than a predetermined ratio, when the transistor is turned on.

According to an embodiment, the wireless power transmitter may further include a switch (e.g., the switch 601b of FIG. 8A or FIG. 8B) and a fifth capacitor (e.g., the fifth capacitor 601a of FIG. 8A or FIG. 8B) connected (directly or indirectly) in series to each other. The wireless power transmitter may be configured to control the switch to an on state based on a decrease of an impedance facing the second LC resonant circuit to or below a third predetermined magnitude.

According to an embodiment, the switch and the fifth capacitor may be connected (directly or indirectly) to the other end of the second LC resonant circuit.

According to an embodiment, part of the first inductor may form a second inductor, and remaining part of the first inductor may form a third inductor connected (directly or indirectly) in series to the second inductor.

According to an embodiment, the switch and the fifth capacitor may be connected (directly or indirectly) to a node in which the second inductor and the 5 third inductor are connected.

According to an embodiment, part of the first inductor and the first capacitor may be configured to operate as a first-order filter at the operating frequency.

According to an embodiment, the wireless power transmitter may further include a fifth inductor connected (directly or indirectly) in series to the third capacitor.

According to an embodiment, the power amplifier may include a transistor and an RF choke inductor connected (directly or indirectly) to the transistor. An available range for determining the first inductance value may be determined based on the second inductance value and an inductance value of the RF choke inductor.

According to an embodiment, as the second inductance value increases, a lower bound of the available range for determining the first inductance value may decrease.

According to an embodiment, as the second inductance value decreases, a lower bound of the available range for determining the first inductance value may increase.

According to an embodiment, as the inductance value of the RF choke inductor increases, a lower bound of the available range for determining the first inductance value may increase.

According to an embodiment, as the inductance value of the RF choke inductor decreases, a lower bound of the available range for determining the first inductance value may decrease.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to", "connected with", or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program 140) including one or more instructions that are stored in a storage medium (e.g., internal memory 136 or external memory 138) that is readable by a machine (e.g., an electronic device 101). For example, a processor (e.g., a processor 120 including processing circuitry) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium. Each processor herein includes processing circuitry.

According to an embodiment, a method According to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least a part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be avoided, or one or more other components may be added. Alternatively or additionally, a plurality of components (e.g., modules or programs) may be integrated into a single component. In such a case, According to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or avoided, or one or more other operations may be added.

What is claimed is:

1. A wireless power transmitter comprising:
a power amplifier configured to output an amplified signal based at least on an input signal and a DC (Direct Current) signal as a driving voltage and including a transistor;
a first LC resonant circuit connected in parallel to the transistor of the power amplifier;
a matching circuit; and
a transmission coil connected to the matching circuit, wherein the matching circuit comprises:
a second LC resonant circuit including a first inductor and a first capacitor connected in series to the first inductor and having first end connected to an output terminal of the power amplifier, and
a second capacitor having a first end connected to a second end of the second LC resonant circuit, wherein a second end of the second capacitor is connected to a ground level, and
a third capacitor having a first end connected to the second end of the second LC resonant circuit, wherein a second end of the third capacitor is connected to the transmission coil,
wherein the first inductor is configured to have an inductance value leading to an impedance value of the second LC resonant circuit equal to or greater than a first predetermined impedance value at a second or higher harmonic frequency of an operating frequency of the input signal.

2. The wireless power transmitter of claim 1, wherein at least part of the first inductor is configured to have an impedance value equal to or greater than a second predetermined impedance value at the second or higher harmonic frequency.

3. The wireless power transmitter of claim 1, wherein the inductance value is a sum of a first inductance value leading to a resonance frequency of part of the first inductor and the first capacitor, corresponding to an operating frequency, and a second inductance value leading to a resonance frequency of remaining part of the first inductor and the second capacitor, corresponding to the operating frequency.

4. The wireless power transmitter of claim 3, wherein the part of the first inductor forms a second inductor, and
wherein the remaining part of the first inductor forms a third inductor connected in series to the second inductor.

5. The wireless power transmitter of claim 4, wherein the second inductor is connected in series to the first capacitor.

6. The wireless power transmitter of claim 4, wherein the third inductor is connected to the second capacitor and the third capacitor.

7. The wireless power transmitter of claim 1, wherein the first LC resonant circuit comprises a fourth inductor and a fourth capacitor connected in series to each other, and
wherein a resonance frequency of the first LC resonant circuit corresponds to a second harmonic frequency of the operating frequency.

8. The wireless power transmitter of claim 1, further comprising a shunt capacitor connected in parallel to the power amplifier and the first LC resonant circuit, respectively.

9. The wireless power transmitter of claim 1,
wherein the first predetermined impedance value is determined in a range satisfying a first condition that a voltage across the transistor is less than or equal to zero, and a second condition that a ratio of a fundamental component of the voltage across the transistor is equal to or greater than a predetermined ratio, when the transistor is turned on.

10. The wireless power transmitter of claim 1, further comprising a switch and a fifth capacitor connected in series,
wherein the wireless power transmitter is configured to control the switch to an on state based on a decrease of an impedance facing the second LC resonant circuit to or below a third predetermined impedance value.

11. The wireless power transmitter of claim 10, wherein the switch and the fifth capacitor are connected to the second end of the second LC resonant circuit.

12. The wireless power transmitter of claim 10, wherein part of the first inductor forms a second inductor, and wherein a remaining part of the first inductor forms at least a third inductor connected in series to the second inductor.

13. The wireless power transmitter of claim 10, wherein the switch and the fifth capacitor are connected to a node in which the second inductor and the third inductor are connected.

14. The wireless power transmitter of claim 1, wherein part of the first inductor and the first capacitor are configured to operate as a first-order filter at the operating frequency.

15. The wireless power transmitter of claim 1, further comprising a fifth inductor connected in series to the third capacitor.

16. The wireless power transmitter of claim 3, wherein the power amplifier includes a radio frequency (RF) choke inductor connected to the transistor.

17. The wireless power transmitter of claim 16, wherein an available range for determining the first inductance value is determined based on the second inductance value and an inductance value of the RF choke inductor, and wherein as the second inductance value increases, a lower bound of the available range for determining the first inductance value decreases.

18. The wireless power transmitter of claim 16, wherein an available range for determining the first inductance value is determined based on the second inductance value and an inductance value of the RF choke inductor, and wherein as the second inductance value decreases, a lower bound of the available range for determining the first inductance value increases.

19. The wireless power transmitter of claim 16, wherein as an inductance value of the RF choke inductor increases, a lower bound of available range for determining the first inductance value increases.

20. The wireless power transmitter of claim 16, wherein as an inductance value of the RF choke inductor decreases, a lower bound of available range for determining the first inductance value decreases.

* * * * *